(12) United States Patent
Sapkota et al.

(10) Patent No.: US 9,204,359 B2
(45) Date of Patent: Dec. 1, 2015

(54) CLIENT-CONTROLLED HANDOVER BETWEEN RADIO TECHNOLOGIES

(75) Inventors: Bhawani Sapkota, Fremont, CA (US); Timothy S. Olson, San Jose, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 1542 days.

(21) Appl. No.: 12/171,037

(22) Filed: Jul. 10, 2008

(65) Prior Publication Data

US 2010/0009674 A1 Jan. 14, 2010

(51) Int. Cl.
*H04W 88/06* (2009.01)
*H04W 36/36* (2009.01)
*H04W 36/14* (2009.01)
*H04L 29/06* (2006.01)

(52) U.S. Cl.
CPC .......... *H04W 36/36* (2013.01); *H04L 65/1093* (2013.01); *H04L 65/1096* (2013.01); *H04L 65/1006* (2013.01); *H04W 36/14* (2013.01)

(58) Field of Classification Search
CPC ..................................................... H04W 36/24
USPC ................................... 455/426.1, 127.4, 437
See application file for complete search history.

(56) References Cited

U.S. PATENT DOCUMENTS

| | | | |
|---|---|---|---|
| 5,307,400 A | 4/1994 | Sawyer et al. | |
| 5,490,201 A | 2/1996 | Moberg et al. | |
| 5,913,166 A | 6/1999 | Buttitta et al. | |
| 6,058,311 A | 5/2000 | Tsukagoshi | |
| 6,278,707 B1 | 8/2001 | MacMillan et al. | |
| 6,347,085 B2 | 2/2002 | Kelly | |
| 6,381,456 B1 | 4/2002 | Ko | |
| 6,725,044 B2 | 4/2004 | Verma et al. | |
| 6,735,621 B1 | 5/2004 | Yoakum et al. | |
| 6,741,695 B1 | 5/2004 | McConnell et al. | |
| 6,957,065 B1 | 10/2005 | Lindholm | |
| 7,027,433 B2 | 4/2006 | Tuohino et al. | |
| 7,079,511 B2 | 7/2006 | Abrol et al. | |
| 7,177,636 B2 | 2/2007 | Oda et al. | |
| 7,379,436 B2 | 5/2008 | Jiang | |
| 7,395,068 B2 * | 7/2008 | Sylvain | .......................... 455/445 |
| 7,395,085 B1 | 7/2008 | Mauer et al. | |
| 7,426,265 B2 | 9/2008 | Chen et al. | |

(Continued)

FOREIGN PATENT DOCUMENTS

WO WO 2005/084128 A2 9/2005
WO WO 2006/027772 A2 3/2006

(Continued)

*Primary Examiner* — Vladimir Magloire
*Assistant Examiner* — Frank Donado
(74) *Attorney, Agent, or Firm* — Tarolli, Sundheim, Covell & Tummino LLP

(57) ABSTRACT

In one embodiment a mobile client includes a first voice interface configured to communicate voice media via a first radio technology. A second voice interface is configured to communicate voice media via a second radio technology, which is different from the first radio technology. A data interface can communicate data via at least one of the first radio technology and the second radio technology. Call control is programmed to control the data interface to perform signaling from the mobile client for establishing parameters for a voice media session between the mobile client and a third party via a selected one of the first voice interface and the second voice interface The call control controls the signaling from the mobile client depending on which of the first voice interface and the second voice interface the call control determines to utilize for the voice media session.

20 Claims, 10 Drawing Sheets

(56) References Cited

U.S. PATENT DOCUMENTS

| | | | |
|---|---|---|---|
| 7,466,810 B1 * | 12/2008 | Quon et al. | 379/201.01 |
| 7,664,495 B1 | 2/2010 | Bonner et al. | |
| 7,986,665 B2 * | 7/2011 | Kezys et al. | 370/331 |
| 2001/0043571 A1 * | 11/2001 | Jang et al. | 370/260 |
| 2002/0094811 A1 | 7/2002 | Bright et al. | |
| 2002/0101859 A1 | 8/2002 | Maclean | |
| 2002/0147008 A1 | 10/2002 | Kallio | |
| 2002/0187780 A1 * | 12/2002 | Souissi | 455/426 |
| 2006/0030357 A1 | 2/2006 | McConnell et al. | |
| 2006/0058032 A1 * | 3/2006 | Pearce et al. | 455/444 |
| 2006/0070003 A1 * | 3/2006 | Thompson et al. | 715/758 |
| 2006/0079236 A1 | 4/2006 | Del Pino et al. | |
| 2006/0291483 A1 | 12/2006 | Sela | |
| 2007/0037578 A1 | 2/2007 | Besterman | |
| 2007/0254648 A1 | 11/2007 | Zhang et al. | |
| 2007/0291733 A1 | 12/2007 | Doran et al. | |
| 2008/0139230 A1 * | 6/2008 | Mottes | 455/466 |
| 2009/0086742 A1 * | 4/2009 | Ghai et al. | 370/401 |
| 2010/0197288 A1 * | 8/2010 | Camilleri et al. | 455/416 |

FOREIGN PATENT DOCUMENTS

| | | |
|---|---|---|
| WO | WO 2006/036641 A1 | 4/2006 |
| WO | WO 2007/120921 A2 | 10/2007 |
| WO | WO 2008/015660 A1 | 2/2008 |
| WO | WO 2008/027686 A2 | 3/2008 |

\* cited by examiner

```
SIP/2.0 200 OK
From: <sip:4082036071@agitonetworks.com>;tag=9384A07C-1560
To: <sip:8098@192.168.3.101>;tag=b70c9170-6503a8c0-13c4-45026-188b7-2532e3a8-188b7
Call-ID: D605CB78-ABC11DD-BF61AA69-CB5D388@agitonetworks.com    ← 158
CSeq: 101 INVITE
Via: SIP/2.0/UDP 192.168.1.240:5060;branch=z9hG4bK1202A352   ← 156
Contact: <sip:8098@192.168.3.101:5068>
Content-Type: application/sdp
Content-Length: 256
```
180 ⟩ 182

```
v=0
o=AgitoRoamAnywhere-SIP-Server 25031975 0 IN IP4 192.168.3.101
s=Agito HMP Call
i=session information
c=IN IP4 192.168.3.101   ← 186
t=0 0   ← 188
m=audio 25372 RTP/AVP 0 101
a=rtpmap:0 PCMU/8000
a=rtpmap:101 telephone-event/8000
a=fmtp:101 0-15
a=ptime:20
```
184

FIG. 5

```
ACK sip:8098@192.168.3.101:5068 SIP/2.0
Via: SIP/2.0/UDP 192.168.1.240:5060;branch=z9hG4bK1202B473    ← 156
From: <sip:4082036071@agitonetworks.com>;tag=9384A07C-1560
To: <sip:8098@192.168.3.101>;tag=b70c9170-6503a8c0-13c4-45026-188b7-2532e3a8-188b7
Date: Wed, 16 Apr 2008 07:23:25 GMT
Call-ID: D605CB78-ABC11DD-BF61AA69-CB5D388@agitonetworks.com   ← 158
Max-Forwards: 70
CSeq: 101 ACK
Allow-Events: telephone-event
Content-Length: 0
```
190

CLIENT-CONTROLLED HANDOVER BETWEEN RADIO TECHNOLOGIES

TECHNICAL FIELD

The present invention relates generally to communications and, more particularly, to a system and method for performing client handover between different radio technologies.

BACKGROUND

Fixed and mobile convergence (FMC) solutions are being developed to enable substantially seamless interoperability of different communication technologies and platforms. To this end many wireless devices are being manufactured to support services using more than one type of wireless communication technology. For example, portable electronic devices, such as cellular telephones, laptop computers and personal digital assistants, can include interfaces that enable operation using cellular technologies, wireless local area network (WLAN) technologies, and/or Bluetooth technologies to name a few.

As a further example, many enterprise networks support voice over internet protocol (VoIP) that can run over one or more wireless networks. For instance, WiFi voice networks currently support VoIP and, with little integration, with a wider area voice network, such as cellular networks.

SUMMARY

The invention relates generally to a system and method for performing client-controlled handover between different radio technologies.

One embodiment relates to a mobile client that includes a first voice interface configured to communicate voice media via a first radio technology. A second voice interface is configured to communicate voice media via a second radio technology, which is different from the first radio technology. A data interface can communicate data, such as via at least one of the first radio technology and the second radio technology. Call control is programmed to control the data interface to perform signaling from the mobile client for establishing parameters for a voice media session between the mobile client and a third party via a selected one of the first voice interface and the second voice interface. The call control controls the signaling from the mobile client depending on which of the first voice interface and the second voice interface the call control determines to utilize for the voice media session.

Another embodiment of the invention relates to a mobile client programmed to perform a method. The method includes determining which of at least two different radio technologies to employ for a voice media session between the mobile client and a third party. A first voice interface of the mobile client provides for voice communication via a first radio technology and a second voice interface of the mobile client provides for voice communication via a second radio technology. A signaling interface of the mobile client is controlled, based on at least in part on the determination, to provide signaling to at least one of the third party and a predetermined network. The signaling being controlled to provide for at least one of:
(i) establishing the voice media session between the mobile client and the third party via a selected one of the first voice interface and the second voice interface; and
(ii) transferring an on-going media session between the mobile client and the third party from one of the first voice interface and the second voice interface to another of the first voice interface and the second voice interface.

Yet another aspect of the invention relates to a method that includes initiating a call from a wireless mobile client to itself via a first voice interface to establish a first client call leg. The first client call leg provides a logical connection between the first voice interface and a predetermined network. The method also includes responding at the wireless mobile client to signaling received from the predetermined network at a signaling interface of the wireless mobile client for establishing a second client call leg having a logical endpoint at the signaling interface of the wireless mobile client. The signaling that is received from the predetermined network is provided in response to the call from the wireless mobile client to itself. The signaling interface can provide a substantially persistent connection between the mobile client and the predetermined network. Signaling can be performed via the signaling interface to establish a voice media session between the wireless mobile client and a third party, which session includes a logical endpoint in the predetermined network. The signaling performed via the signaling interface can be controlled to establish the voice media session based on a determination made by the mobile client.

BRIEF DESCRIPTION OF THE DRAWINGS

FIG. 5 is an example of a reply, such as in response to the invite request of FIG. 4, which can be utilized as part of signaling in a system implemented according to an aspect of the invention.

FIG. 6 is an example of an acknowledgement, such as in response to the reply request of FIG. 5, which can be utilized as part of signaling in a system implemented according to an aspect of the invention.

DETAILED DESCRIPTION

Figure 1:
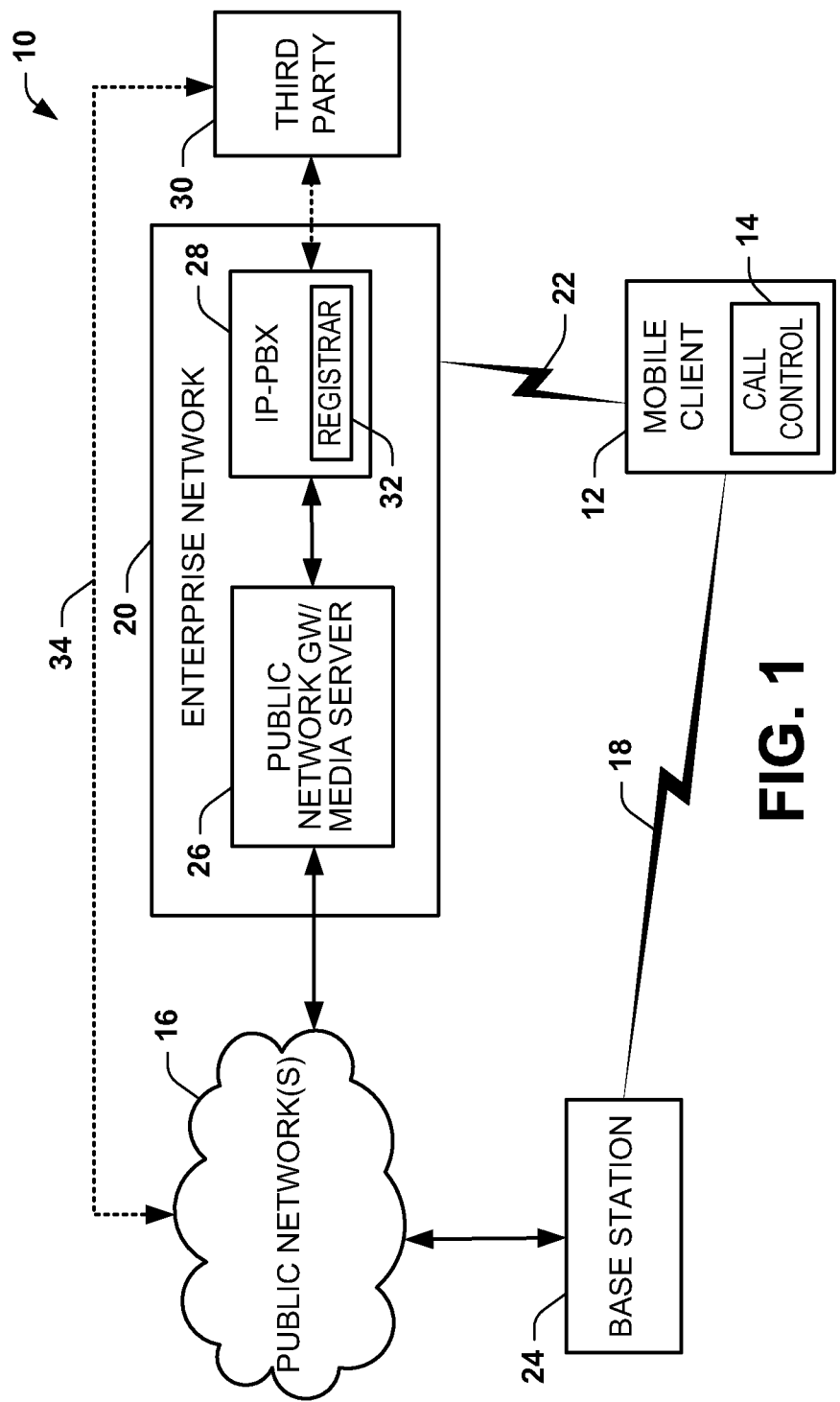
FIG. 1 is a diagram of a system in which a mobile client can operate according to an aspect of the invention.

The invention relates to an apparatus, to systems and to methods that provide for performing client-controlled handover between different radio technologies implemented by a mobile client. The client-controlled handoff can be utilized in a variety of call scenarios, including: initiating a call from a mobile client, receiving a call at the mobile client, as well switching an on-going call at the mobile client between different radio technologies. It will be understood that, as used herein, the phrase "client-controlled" and its variants as applied to the handover scenarios do not require that the handoff be implemented by the mobile client without any use of other systems or processes running in other devices. For example, signaling and call connection with the mobile client will utilize available resources, which vary according to the type of radio technology being used. Instead, the phrase "client-controlled" is intended to convey the understanding that the decision to perform such handoff between radio technologies as well as the manner of establishing and maintaining a media session with the mobile client, including any handoff between radio technologies, are controlled by the mobile client. Since handoff between radio technologies is under the control of the mobile client, no modifications to existing network systems are required. Thus, the approach described herein can be implemented more efficiently and economically since server side application components, which are typically required, can be eliminated.

As will be appreciated by those skilled in the art, portions of the invention, including the call control logic, may be embodied as a method, data processing system, or computer program product. Accordingly, these portions of the invention may take the form of an entirely hardware embodiment, an entirely software embodiment, or an embodiment combining software and hardware. Furthermore, portions of the invention may be embodied as a computer program product on one or more computer-usable storage medium having computer readable program code on the medium (or media). Any suitable computer-readable medium may be utilized including, but not limited to, static and dynamic storage devices, hard disks, optical storage devices, and magnetic storage devices, which may reside at one location or be distributed among storage devices.

Certain embodiments of the invention are described herein with reference to signaling diagrams and functional block diagrams of methods, systems, and computer program products. It will be understood that blocks of the illustrations, and combinations of blocks in the illustrations, can be implemented by computer-executable instructions. These computer-executable instructions may be provided to one or more processor of a special purpose computer, or other programmable data processing apparatus (or a combination of devices and circuits, such as in the form of a mobile client) to produce a machine, such that the instructions, which execute via the processor, implement the functions described with respect to the block or blocks.

These computer-executable instructions may also be stored in computer-readable memory that can direct a computer (or computers) or other programmable data processing apparatus (e.g., a mobile client) to function in a particular manner, such that the instructions stored in the computer-readable memory result in an article of manufacture including instructions which implement the function specified in the block or blocks. The computer program instructions may also be loaded onto one or more computer or other programmable data processing apparatus or appliance to cause a series of operational steps to be performed on the computer or other programmable apparatus or appliance to produce a computer implemented process such that the instructions which execute on the computer or other programmable apparatus provide steps for implementing the functions specified in the flowchart block or blocks as well as provide for types of signaling depicted in signaling diagrams.

In certain embodiments, the mobile client can be a multimode device configured to operate in any number of two or more different radio technologies, any of which may be utilized to send or receive a voice call as well as communicate data to perform signaling. As used herein, the term "radio technology" and variations of this term are intended to encompass any form of wireless communication that may be utilized to send, to receive or to send and receive audio signals (including voice signals), data signals or a combination of voice and data signals without requiring a hard-wired or other physical connection. Examples of different radio technologies include cellular telephones (e.g., 2G, 3G or 4G Global System for Mobile (GSM) technologies), personal communication system (PCS) communication technologies, wireless networks, (e.g., wireless local area networks (WLAN), such as WiFi; wireless metropolitan area networks (WirelessMAN), such as WiMAX; and any variation and improvements thereof), satellites, Bluetooth, two-way (or half-duplex) radio, and any combinations thereof. Those skilled in the art will understand and appreciate that various standards and protocols exist and have yet to be developed to enable communication of data and voice via these and other radio technologies. For example, the mobile client can be embodied in any form of technology, such as including a cellular telephone, personal digital assistant (PDA), a portable computer (e.g., a laptop computer, or tablet computer) and the like.

As used herein, a "logical connection" can refer to any path (direct or indirect) that information may travel between two or more endpoints. The endpoints of a given logical can reside in different hardware components or the same hardware components. As an example, the endpoints of a logical connection can be identified by addresses (e.g., IP addresses), ports or a combination of addresses and ports. Those skilled in the art will understand and appreciate various approaches and protocols that can be utilized for different endpoints to establish and to communicate with each other over a logical connection. The protocols further may vary according to the type of path that forms the logical connection. For instance, the path between endpoints of a logical connection can include one or more physical connections (e.g., wires, optical fibers or other circuitry), wireless connections (e.g., using any radio technology), or a combination of physical and wireless connections.

Turning to FIG. 1, a system 10 is depicted in which a mobile client 12 can operate according to an aspect of the invention. The mobile client 12 can be implemented as a multimode device that includes a plurality of (i.e., two or more) wireless interfaces. The mobile client 12 is configured to communicate data and voice using one or more of the wireless interfaces. Each wireless interface employs a corresponding communication protocol for communication of voice, data and or voice and data via an associated radio technology. For example, the mobile client 12 can include a data interface and a voice interface that can be employed to send and receive data and voice, respectively, relative to the mobile client using a first radio technology (e.g., a cellular radio technology). The protocol can permit concurrent communication of voice and data via corresponding interfaces of the mobile client. Another of the wireless interface at the mobile client 12 can be configured to provide for communication of voice, data or a combination of voice and data via a radio technology different from the first wireless interface.

As described herein, the mobile client 12 includes a call control 14 that is programmed to control calling functionality for the mobile client, including transfers or handoff of a call from one radio technology to a different radio technology. Such transfers can be implemented by the call control 14 of the mobile client 12 as a handover for an on-going voice call session or, alternatively, the transfer can be performed as part of a process to establish a new voice call session over a selected one of the different radio technologies.

The mobile client 12 thus can communicate through one or more public network 16 using a first radio technology via a communication link 18. The mobile client 12 can also communicate with a private enterprise network 20 using a second radio technology via another communication link 22, such as a wireless link with one or more wireless access point in the enterprise network 20. The mobile client can include data and voice interfaces to provide for communication of data and voice media through each of the communication links 18 and 22.

As one example, the mobile client 12 can employ a cellular interface to connect to a base station 24 of a cellular network via the wireless communication link 18. For instance, the communication link 18 can be implemented according to a corresponding cellular telecommunications protocol (e.g., 2G, 3G or 4G Global System for Mobile (GSM) technologies, PCS). In the example of FIG. 1, the base station 24 is in communication with the public network(s) 16, which communication can be provided via a physical or wireless connection. The public network 16 may include one or more Public Land Mobile Network (PLMN) and/or the Public Switched Telephone Network (PSTN). Thus, at least one of the wireless interfaces in the mobile client 12 can provide a link to the public network 16 via the base station 24.

The enterprise network 20 is also coupled to the public network 16, such as via a public network gateway (e.g., a PSTN gateway)/media server 26. The gateway/media server 26 provides a node in the enterprise network 20 that is configured for interfacing with the public network 16. This node can provide a logical endpoint having an address in the network 20. For instance, the gateway/media server 26 may contain devices such as protocol translators, impedance matching devices, rate converters, fault isolators, or signal translators as necessary to provide system interoperability between the enterprise network 20 and the public network 16.

The enterprise network 20 also includes an IP-PBX 28 in communication with gateway/media server 26, such as via a plurality of telephone lines or an ISDN interface (e.g., PRI/BRI). The IP-PBX 28 can provide a variety of PBX functionality as well as provide for communication using an IP protocol, including VoIP for devices residing in communication with the enterprise private network via a VoIP interface (e.g., the mobile client 12 via the link 22 or a third party 30. There can be any number of one or more third parties 30.

The third party 30 can be connected to the public network 16, such as corresponding to a mobile or wireless device (e.g., such as another mobile client or other type of mobile device), or a telephone connected to the PSTN—either directly or through a PBX. Additionally or alternatively, the third party 30 can correspond to a device that exists (e.g., as a network location) in the enterprise network 20. For instance, the third party 30 can be a station that is connected to the IP PBX 28, such as in the form of a VoIP telephony unit that is capable of communicating with the IP PBX using an IP protocol. The gateway/media server 26 of the enterprise network 20 can include one or more applications (e.g., a media server) programmed to control routing of voice and data streams to and from devices and processes operating within the network.

The mobile client 12 is configured with a data interface that provides a substantially persistent data connection with the enterprise network 20. The mobile client 12 can employ the data interface to communicate with the enterprise network 20 and, in particular, with the IP PBX 28 using a corresponding radio technology. It will be understood that any one of the plurality of available radio technologies can be used for this data interface. Additionally, the radio technology for such data interface can be fixed or it may change during operation based on the availability of a coverage using the different radio technologies.

The IP PBX 28 can include a registrar (e.g., a SIP registrar) 32 that can store a number of contact addresses for a set of registered users. The registrar 32, for example, can include a server (e.g., a Session Initiation Protocol (SIP) server) and memory that stores the contact addresses and other information associated with each of the registered users. The registrar 32 thus can include address data for each registered user, such as including an IP-address, one or more enterprise telephone number, a local extension within the enterprise network 20 or other information that can be used by the IP PBX 28 to uniquely identify and contact each client registered in the network.

The mobile client 12 can employ a data interface to register itself with the IP PBX 28 (as well as other nodes) of the network 20, which registration establishes a defined endpoint at the mobile client for sending and receiving data communication. For instance, the mobile client 12 can employ such data interface to register its contact address (e.g., an IP address and port) with the IP PBX 28, such as at power up. The mobile client 12 may also update its contact address periodically via the substantially persistent connection provided via the data interface. The data interface of the mobile client 12, for example, can be a signaling interface, such as a SIP interface. Thus, once the mobile client 12 is registered, the IP PBX 28 can initiate signaling to establish a session with the mobile client based on the contact address and other information stored in the registrar 32.

The IP PBX 28 thus can employ a signaling protocol, such as the Session Initiation Protocol (SIP), to create, modify and terminate a session with one or more participants. SIP is a well known application-layer control (signaling) protocol for creating, modifying and terminating sessions with one or more participants. Details about SIP are set forth in RFC 3261 and its extensions, which is maintained and published by the Session Initiation Protocol (SIP) working group of the Internet Engineering Task Force, and which is incorporated herein by reference. Those skilled in the art will understand that other signaling protocols can be utilized by the mobile client 12 and the enterprise network 20 to set up and tear down a media (e.g., a VoIP or data) session connection between the mobile client and other parties and devices. Examples of some other protocols that can be utilized in the system 10 to set up and tear down a media session include the H.323 protocol and the Skinny Call Control Protocol (SCCP), which is a proprietary terminal control protocol of Cisco Systems, Inc. The signaling can also include session description information that defines or proposes parameters or initializing streaming media, such as for a VoIP media session.

By way of further example, the mobile client 12 can include two more telephone numbers, such as a public enterprise telephone number (also known as a "one number") and a private cellular telephone number. One or both of these numbers may be stored in the registrar 32 for the mobile client 12. Thus, if the third party 30 calls the public enterprise number via a connection 34 with the public network 16, the call is routed from the public network to the gateway/media server 26 of the enterprise network 20. The gateway/media server 26 employs signaling to forward the call to the IP PBX 28, which employs the registrar 32 to ascertain to where the call should be connected. Based on the information in the registrar 32, the IP-PBX 28 performs signaling to the contact address of the mobile client 12. The mobile client 12 is also configured to perform signaling via its data interface to establish a call leg between the mobile client and another endpoint, such as may be a data session or a voice media session.

According to an aspect of the invention, the mobile client 12 is programmed to determine which radio technology should be used for communicating a voice call. This determination can be made by the mobile client 12 based on an analysis performed for one or more of a variety of parameters, such as including available bandwidth or coverage for a given radio technology, location of the mobile client, and/or other characteristics that can provide an indication of whether a voice media session can be sustained using a given radio technology. This determination can be made by the mobile client 12 for outgoing calls as well as for incoming calls. The particular signaling utilized to establish a call session for an incoming or outgoing call thus varies according to the determination made by the mobile client 12 as to which radio technology should be utilized for the call and whether the call is an incoming call or an outgoing call.

In the following examples it is assumed, for simplicity of explanation, that the mobile client 12 is a dual mode device that can includes a cellular voice interface and a cellular data interface (which provides the substantially persistent data connection for communicating with the IP-PBX) both of which are provided via the communication link 18. The mobile client also includes another voice interface that communicates using a second radio technology via the communication link 22, which is a different type of radio technology from cellular (e.g., a VoIP interface using WiFi or WiMAX).

As one example, for an incoming call from the third party 30 to the enterprise number of the mobile client 12, the call can be routed to the IP BPX 28 from the public network 16. Responsive to this incoming call, the IP PBX 28 provides a stimulus to the mobile client 12. The stimulus can be implemented as signaling with the mobile client based on the contact address data stored in the registrar 32. In this example, it is assumed that the substantially persistent data interface is a cellular interface via the communication link 18. In response to the signaling from the IP-PBX 28, the call control 14 of the mobile client 12 determines which voice interface to utilize for the call. Assuming that, given the ability to sustain a voice call sufficiently over either communication link 18 and 22, for purposes of this example, the mobile client will chose the communication link 22, such as due to a predefined precedence. Those skilled in the art will understand and appreciate various types of routing and least cost algorithms that can be used as part of the call control 14.

If the call control 14 of the mobile client 12 determines that the call can be sustained adequately using the second radio technology (e.g., WiFi or WiMAX) via the link 22, the mobile client 12 can send a reply via its data interface to the signaling request from the IP PBX 28 with information identifying parameters for establishing a media session at mobile client via its voice interface for communication over the link 22. For instance, the media session can include a call leg that provides a logical connection between an IP address and port at the voice interface of the mobile client (as specified in the reply from mobile client) and an address and port for a gateway/media server 26 (as specified in the request from the IP PBX) to which the third party is connected via the public network 16.

As an alternative example, if the call control 14 running in the mobile client 12 determines that the incoming voice call cannot be sustained using the second radio technology (e.g., WiFi or WiMAX) via the link 22, the mobile client 12 determines that its cellular interface is required for establishing communication with the third party 30. In this scenario, the mobile client 12 can employ its cellular interface to initiate a "stealth" call over the communication link 18. The term "stealth" as used in this context relates to the call being placed automatically by the mobile client 12 and, likely, without any knowledge by the user. Thus, from the perspective of the user, the mobile client 12 alerts the user of an incoming call received via its substantially persistent data interface, such as by ringing and/or vibrating in a known manner, and the user employs a man-machine interface (e.g., a talk button or touch screen) to answer the call. In response to the user answering the call (or the call otherwise being answered), the mobile client 12 initiates the stealth call to its own enterprise number via the link 18. This call is routed from the base station 24, through the public network 16, to the gateway/media server 26 which passes the call to the IP PBX 28. The IP-PBX 28 in turn performs signaling back to the mobile client 12, according to information stored in the registrar 32, such that call terminates as a signaling request at the data interface of the mobile client 12 (e.g., again via the communication link 18).

The call control 14 is programmed to recognize (based on information in the signaling request from the IP PBX 28) that the signaling request corresponds to the stealth call initiated by the mobile client 12. At this stage, the mobile client 12 has three client call legs: two call legs via its data interface and one call leg initiated via its cellular interface. However, no voice media session need yet be established. To establish the media session, responsive to the signaling request from the network corresponding to the stealth call, the mobile client 12 can perform signaling to establish parameters the media session. Such signaling, for instance, can be employed to connect the remote party and the logical endpoint within the voice gateway (defined by a network address) where the stealth cellular call has been anchored. Thus, the media session is established between the remote party 30 and with the mobile client 12 such that the mobile client is communicating with the third party via its cellular interface over the communication link 18.

For the example of a response to a stimulus at the mobile client 12, such as an outgoing call placed by a user of the mobile client 12 to the third party 30 (e.g., user input provided to the mobile client 12), the call control 14 of the mobile client makes a similar determination as to which voice interface to utilize. If the mobile client 12 can sustain a voice call using the second radio technology (over link 22), the call control 14 can initiate a signaling request to the IP PBX 28 via its substantially persistent data interface (e.g., cellular interface via link 18). The signaling request (e.g., a SIP INVITE) from the mobile client 12 can include session description information that includes a connection address for establishing a voice call via its voice interface associated with the second radio technology (e.g., a VoIP interface over WiFi). The IP PBX 28 replies to the signaling request with an answer to establish the connection parameters for the media session over the link 22 between the mobile client 12 and the third party 30.

Alternatively, if the mobile client 12 determines that it cannot sustain an outgoing voice call using the second radio technology, the call control 14 is programmed to cause the mobile client to, in response to dialing the third party 30, place a stealth call from its cellular voice interface to the predetermined enterprise number for the mobile client. The call is routed from the base station 24, through the public network 16 to the IP PBX 28. The IP PBX 28 The IP-PBX 28 in turn performs signaling back to the mobile client 12, according to information stored in the registrar 32, such that call terminates as a signaling request at the data interface of the mobile client 12 (e.g., again via the communication link 18). In response to recognizing that the signaling request from the IP-PBX 28 corresponds to the stealth call that was self-initiated by the mobile client 12 to its enterprise number, the mobile client 12 employs one of its data interfaces to send a signaling request to a logical endpoint associated with the third party 30, namely, located at the third party. Additional signaling between the mobile client 12 and the third party 30 and between the mobile client and the IP PBX 28 can be utilized to set connection parameters for establishing a media session between the third party and the cellular interface of the mobile client. This media session thus can establish a logical connection between the mobile client 12 and the gateway/media server 26 (wherein the stealth cellular call had been anchored) and a connection between the gateway/media server 26 and the third party 30. As a result, the cellular initiated call from the mobile client 12 is fully established and the mobile client is communicating with the third party 30 via its cellular voice interface over the communication link 18.

In addition to controlling which interface to utilize when initiating an outgoing call from the mobile client 12 and when receiving an incoming call placed to the mobile client, the call control 14 can be programmed to control switching an active voice call between different radio technologies implemented by the mobile client. For instance, the call control 14 can be programmed to control handoff of an active call from the second radio technology (e.g., WiFi or WiMAX) to cellular radio technology. Additionally or alternatively, the call control 14 can be programmed to control handoff of an active voice call from the cellular radio technology to the second radio technology. Those skilled in the art will understand and appreciate various mechanisms that can be employed by the mobile client 12 to trigger a handoff between the different radio technologies. For example, the call control 14 can be programmed to trigger a handoff based on a location of the mobile client, a detected signal strength, signal quality, remaining battery power of the mobile client, or any combination of these and/or other criteria. Some examples of mechanisms that can be utilized by the mobile client to trigger the handoff between different radio technologies are disclosed in U.S. patent application Ser. No. 11/778,831, which was filed on Jul. 17, 2007, and entitled SYSTEM AND METHOD TO FACILITATE HANDOVER, the specification of which is incorporated herein by reference.

By way of example, assume that the mobile client 12 is engaged in an active voice call with the third party 30 using its second radio technology (e.g., WiFi or WiMAX) via a VoIP interface. During this active voice call, the call control 14 of the mobile client 12 determines that a handoff of the active call from the second radio technology to the cellular radio technology is required in response to a stimulus (e.g., a change in an indication of voice radio coverage). This determination can be made by the mobile client based on a variety of factors such as described herein (e.g., location, signal strength, signal quality, battery power level, available bandwidth, and the like). In response to this determination, the call control 14 causes a stealth call to be placed to the enterprise number via the cellular voice interface. The call is routed from the base station 24, through the public network 16 to the gateway/media server 26 and to IP PBX 28.

The IP PBX 28 employs signaling to the contact address associated with the mobile client 12 (based on information stored in the registrar 32) so as to establish a client call leg between the IP PBX 28 and the mobile client via the data interface of the mobile client (e.g., the cellular data interface that provides a substantially persistent logical connection with the IP-PBX). At this time, it will be appreciated that the mobile client 12 has three associated call legs: the initial VoIP call leg over the link 22, the new data call leg via its data (e.g., SIP) interface and one cellular call leg. The call control 14 employs the session description information from the signaling that was performed to send another signaling request (e.g., a SIP RE-INVITE) via its data interface to re-connect the media stream directly between the third party 30 and the address in the gateway, which defines a logical endpoint where the cellular initiated has been anchored.

As yet another example, assume that the mobile client 12 is engaged in an active voice call with the third party 30 via its cellular voice interface, such as may be established according to any of the applicable scenarios described herein. Thus, the cellular call session for the mobile client 12 is anchored in the enterprise network 20. Again, it is assumed that the call control 14 is programmed to use of the second radio technology over the cellular radio technology for voice calls, when available. In response to the call control 14 determining the availability of coverage over the second radio technology (e.g., WiFi or WiMAX) sufficient to sustain an active voice call, the call control can trigger a handover process. For instance, the mobile client 12 can send a signaling request to the third party 30 via its data interface with session description information requesting that the third party media stream for the active voice call be sent to the mobile client's VoIP interface for the second radio technology. In response to this request, the third party can send the media stream directly to the new address specified in the signaling request, which corresponds to the address for the mobile client's VoIP interface for the second radio technology, instead of the address where the cellular call leg is anchored at the gateway/media server 26. To complete the handover, the mobile client 12 can send a request (e.g., BYE) via its data interface facing the cellular network to disconnect the cellular call. As a result, the mobile client 12 has a single voice media call leg via its VoIP interface for the second radio technology for communicating voice with the third party 30.

Figure 2:
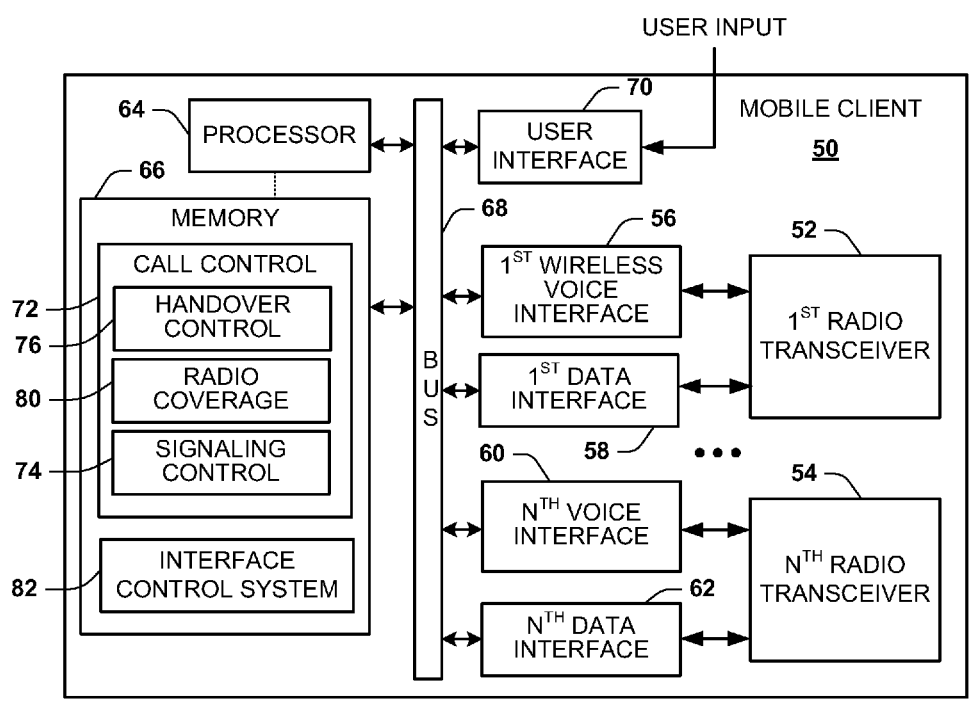
FIG. 2 is a functional block diagram of a mobile client that can be implemented according to an aspect of the invention.

FIG. 2 depicts an example of a mobile client 50 that can be implemented according to an aspect of the invention. The mobile client 50 is configured to communicate using more than one radio technology. To perform such communication, the mobile client 50 includes a corresponding radio transceiver 52, 54 that is configured to provide physical controls and communication via a respective radio technology. The mobile client 50 can include any number of N radio transceivers, where N is a positive integer (N>2) denoting the number of radio technologies utilized by the mobile client 50. The mobile client 50 can also include receivers (e.g., GPS) or other components (not shown) such as can be configured to detect location of the mobile client.

Additionally, to provide for communications over each the radio transceivers 52 and 54, the mobile client 50 includes one or more interface that is associated with each of the respective radio transceivers. In the example depicted in FIG. 2, each radio transceiver 52, 54 can be utilized for the communication of voice and for the communication of data. Thus, the mobile client 50 includes a first wireless voice interface 56 associated with the first radio transceiver 52 and a corresponding first data interface 58 also associated with the first radio transceiver. In this way, the mobile client 50 can employ a corresponding voice interface for communicating a voice media over the first radio transceiver 52 and a corresponding data interface 58 for communicating data over the first radio transceiver 52. Similarly, an Nth voice interface 60 is associated with the Nth radio transceiver and an Nth data interface 62 also is associated with the Nth radio transceiver 54. It is to be understood that one or more of the voice interfaces 56 and 60 as well as one or more of the data interfaces 58 and 62 can be configured to handle one or more concurrent calls concurrently via a respective transceiver 52, 54. Those skilled in the art will understand and appreciate various types of publicly known and proprietary wireless communication standards that each of the interfaces 56, 58, 60 and 62 can be programmed to implement over a corresponding transceiver for encoding and decoding data and voice.

The mobile client 50 also includes a processor 64 that executes instructions stored in associated memory 66. The processor 64 further can execute instructions from the memory 66 for controlling operation of the mobile client 50, much of which functionality can vary depending on the application requirements for the mobile client and the standards to which it has been designed to operate. One aspect of such instructions stored in the memory 66 and executable by the processor 64 relates to controlling communication of voice and data via one or more of the respective interfaces 56, 58, 60 and 62.

The processor 64 can be connected to each of the interfaces 56, 58, 60, and 62 via corresponding bus 68. Those skilled in the art will understand and appreciate that the bus can be a corresponding connection or an arrangement of any number of connections and switching networks to enable internal communication within the mobile client 50 between the respective hardware components. Additionally, it is to be understood that each of the interfaces 56, 58, 60 and 62 can be implemented as including hardware, software or a combination of hardware and software to provide for the communication of voice and data, respectively, via the radio transceivers.

Thus, each of the respective voice interfaces 56 and 60 can be programmed and/or configured to provide for the wireless transmission of voice media through the respective radio transceivers 52 and 54 according to the respective radio technology. Similarly, each of the respective data interfaces 58 and 62 can be programmed and/or configured to provide for wireless transmission and reception of data through the respective radio transceivers implemented according to a respective communication standard. As one example, the first wireless voice interface 56 and first data interface 58 can be programmed and configured to provide for communication of voice and data, respectively, over a cellular radio technology. The data interface 58 can correspond to a signaling interface that has been registered with a PBX operating in an associated enterprise network. The Nth voice interface 60 and the Nth data interface 62 can utilize a radio technology that is different from cellular, such as including WiFi or WiMAX. Thus, the voice interface 60 can provide for VoIP over WiFi or WiMAX. Those skilled in the art will understand and appreciate that these examples of radio technologies represents but one of many possible combinations of different radio technologies that can be implemented in the mobile client 50 according to an embodiment of the invention.

The mobile client 50 can also include a user interface 70 that a user can employ to enter information and otherwise interact with and control functionality of the mobile client. For the example of a typical cellular telephone, the user interface 70 provides a man-machine interface that can include an arrangement of buttons, keypad, a touch screen or a combination thereof. One particular function of the user interface 70 provides a man-machine interface that is configured to enable a user to initiate an outgoing call as well as to receive an incoming call at the mobile client 50.

In accordance with an aspect of the invention, the memory 66 includes a call control block 72, which represents control methods or functions that can be utilized to control initiation, maintenance and termination of outgoing and incoming calls as well to control switching of an existing on-going call between different radio technologies supported by the mobile client 50. For instance, the call control 72 can include a signaling control 74. The signaling control 74 implements a control protocol for creating, modifying and terminating sessions with one or more third party recipients remote to the mobile client 50. As one example, the signaling control 74 can implement an application layer signaling protocol, such as SIP or H.323. The call control 72 is programmed to ascertain whether a signaling request corresponds to a new call session or if it is part of a request for further processing of an existing call session based on information contained within the signaling request.

In the context of an outgoing call, the signaling control 74 can function as a substantially persistent user-agent client that can create new requests and employ the corresponding data interface 58 or 62 and the corresponding transceivers 52 or 54 for performing signaling with respect to the intended third party. The call control 72 is programmed further to ascertain which interface and transceiver and ultimate the radio technology that is to be utilized for a given request, such as according to available coverage (e.g., determined by a radio coverage function 82). While the signaling control 74 is depicted as residing in the call control 72, it will be understood and appreciated that the functionality of the client can further reside or be distributed within the appropriate interfaces 58 and 62 or be implemented separately and accessed via an appropriate call to the signaling control method.

The signaling control 74 is also programmed to respond to corresponding requests made to one of the data interfaces 58 or 62, such as by accepting, rejecting or redirecting a request. At least one of the data interfaces 58 or 62 is configured to provide substantially persistent availability for communication with a private enterprise network to which the mobile client 50 has been registered. The registration within the private enterprise network can include providing a corresponding contact address or data address associated with such interface, which can be available in a persistent manner, such as for communicating with a node in the enterprise network. For example, an IP PBX operating as a node in the enterprise network can include a registrar in which the contact address for the substantially persistent data interface has been stored. Thus, the IP PBX can perform signaling to such data interface 58 or 62 of the mobile client 50, such as in response to a call initiated by a third party as well as to a call initiated by the mobile client itself to a corresponding enterprise telephone number to which the contact address has been associated.

The call control 72 also includes a handover control block 76. The handover control 76 is programmed to determine if an on-going media session between the mobile client and a remote third party should be transferred between different radio technologies implemented by the mobile client 50. Those skilled in the art will understand and appreciate various mechanisms and algorithms that can be utilized to determine whether an existing call should be handed off to a different radio technology, such as those examples described herein as well others known or yet to be developed in the state-of-the art. The handover control 76 can base the handoff decision on whether a voice call can be sustained using a given radio technology.

As a further example, the mobile client 50 can include or utilize a radio coverage function 80 that is programmed to ascertain whether a voice call can be sustained using one or more of the radio technologies. The radio coverage function 80 can analyze one or more characteristics associated with operation of the mobile client as it relates to a given radio technology. For instance, the radio coverage function 80 can analyze one or more indicators for a location of the mobile client (e.g., base station ID, access point ID, GPS, and the like), signal strength for the given radio technology, signal quality for the given radio technology, battery power level for the mobile client, or other mechanisms described herein. Based on the analysis, the radio coverage function 80 can provide an indication of whether coverage is sufficient to sustain a voice call for a voice interface associated with the given radio technology. The radio coverage function 80 can be utilized by the call control 72, including the handover control 76.

By way of example, the signaling control 74, handover control 76 and radio coverage function 80 can work in conjunction with an interface control system 82 that is programmed to control operation of the respective communication interfaces 56, 58, 60 and 62. The processor 64 thus can implement the signaling control 74 and the interface control 82 for initiating communication via a desired data interface 58 or 62 as well as through a corresponding voice interface 56 or 60. For example, the call control 72 can ascertain which radio technology should be utilized in a given call scenario based on the coverage indicator provided by the radio coverage function 80 for initiating a voice call. The handover control 76 can also leverage the coverage indicator provided by the radio coverage function 80 for an on-going call as well as other handoff criteria (e.g., rate plan information) to control switching between radio technologies.

The call control 72 can employ the signaling control 74 in conjunction with the interface control 82 for sending the signaling request or otherwise initiating a call over the appropriate voice or data interface. Similarly, in response to detecting an incoming call such as via one of the voice or data interfaces, appropriate signaling can be extracted from the interface via the signaling control instructions executed by the processor. Appropriate signaling responses can be sent back to through corresponding interface with appropriate session description information so that a corresponding voice call can be connected using the corresponding voice interface 56 or 60, such as described herein. In order for the mobile client to provide for wireless voice communication, it will be understood that at least one wireless voice interface 56 or 60 should be capable for providing wireless voice communication relative to the mobile client at any given time. Additionally, as mentioned above, at least one of the data interfaces can be registered to provide substantially persistent connection with a private network so as to be available for signaling under the control of the signaling control 74.

By way of example, in a mobile client 50 where the first radio technology is a cellular radio technology and the Nth radio technology corresponds to a WiFi technology, it becomes more practical, due to the mobility of the client relative to the WiFi network, to employ the cellular data interface 58 as the substantially persistent data interface that is registered with the private network. It is further to be understood that the mobile client 50 can receive two or more simultaneous or concurrent or calls through its substantially persistent data interface 58. In this way, during an on-going active voice call the mobile client 50 can send as well as receive multiple signaling requests so that signaling can be sent over multiple call legs for establishing a desired voice media session.

Figure 3:
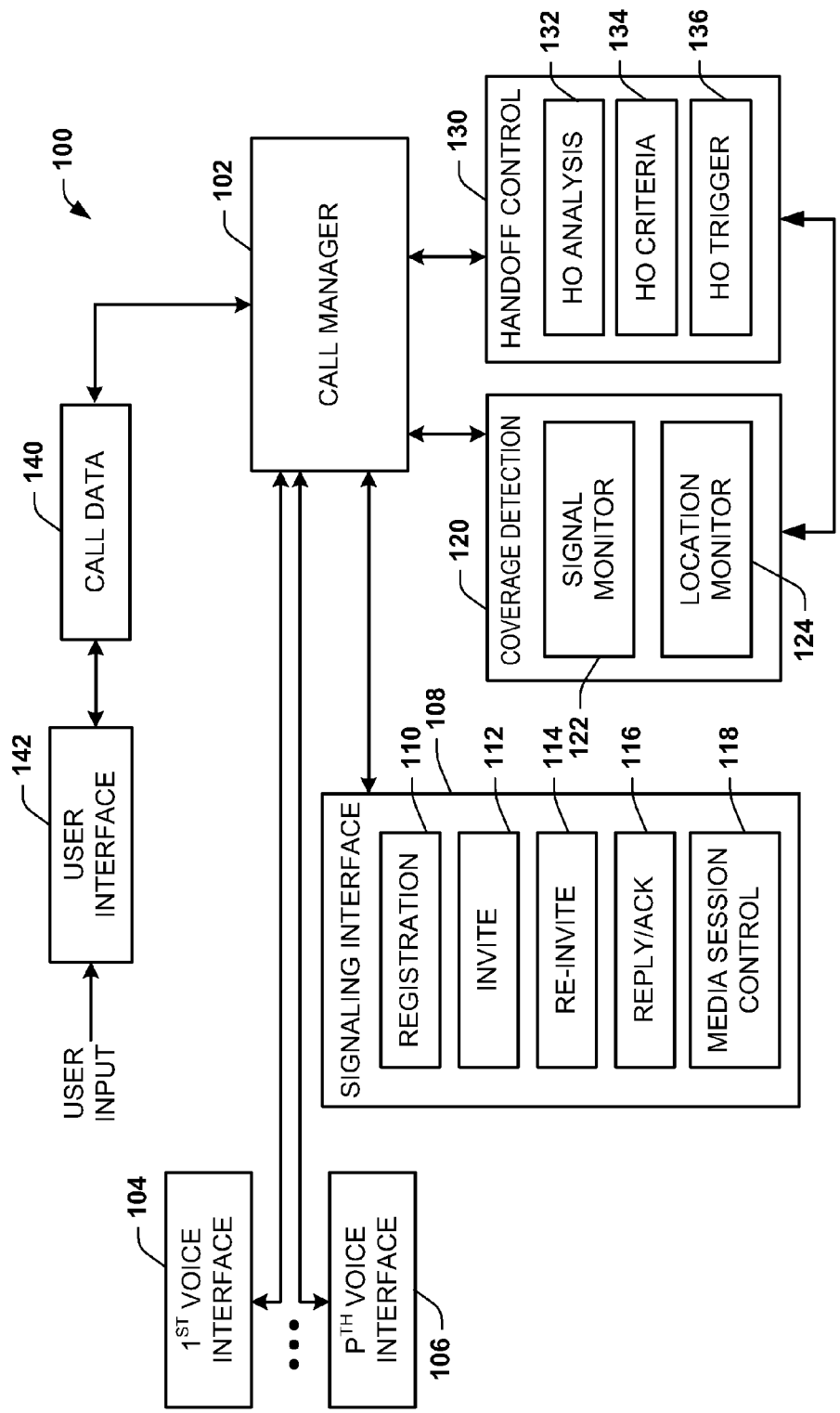
FIG. 3 is a functional block diagram of portions of a mobile client that can implemented according to an aspect of the invention.

FIG. 3 depicts an example of a functional block diagram of a mobile client system 100 for performing client-controlled handover between different radio technologies according to an aspect of the invention. The system 100 can be implemented as a computer-implemented method, such as according to instructions stored in memory (e.g., 66 of FIG. 2) that are executed by one or more processor (e.g., 64 of FIG. 2). In one embodiment, the system 100 is implemented software running in a mobile client device, such as a described herein.

The system 100 includes a call manager 102 that is programmed for controlling operation of the communication interfaces in the mobile client. In the example of FIG. 3, the mobile client includes a plurality of voice interfaces 104 and 106 indicated as the first voice interface through the P voice interface, where P is a positive integer denoting the number of voice interfaces (P>2). The call manager 102 thus controls and routes data, such as in the form of packets or packetized data, to an appropriate one of the wireless voice interfaces 104 and 106. Each of the voice interfaces 104 and 106 can be utilized to communicate voice data over a different radio technology.

The call manager 102 also controls one or more signaling interface 108 for the communication of data, such as including for performing signaling for a call that may be initiated by the mobile client function and responding to signaling that may be sent to the mobile client wirelessly. The signaling interface can perform such signaling and responding via a corresponding radio technology that is implemented by the mobile client. In the example embodiment of FIG. 3, it is to be understood that the signaling interface 108 employs a radio technology that can provide a substantially persistent communication link between the mobile client and a private network to which the mobile client has been authenticated. Examples of cellular radio technologies that can be utilized to provide such a persistent communication link include EDGE, EDGE Evolution, EV-DO, UMTS to name a few. Those skilled the art will understand other existing and yet to be developed cellular network protocols that can be utilized by the signaling interface 108. The particular radio technology typically varies according to the cellular service provider for the mobile client. It will be appreciated that the signaling interface 108 may be fixed to particular radio technology or, alternatively, it may switch between different radio technologies (and re-register with the associated network), such as may vary based on available coverage and/or other operating requirements of the mobile client system 100.

The signal interface 108 further can include other functionality such as the set of methods associated with the above-incorporated SIP protocol RFC 3261. For example, the signaling interface 108 thus may be programmed to include a registration method 110, an invite method 112, a re-invite method 114, and a reply/ACK method 116.

The registration method 110 is programmed to register the signaling interface with the private network and in particular with a predetermined node of the private network, such as an IP PBX operating in the private network. The registration method 110 can involve communication of an address and port identification for the mobile client for communication of signaling requests to the mobile client from the IP PBX. Additionally, the registration at the network side can provide for storage or identification of one or more public telephone numbers such as an enterprise number to which the public network will route calls to the IP PBX intended for the mobile client. Additionally, calls internally made from within the private network can be made via short number dialing, such as by an extension or other short number of digits. Thus, the network can associated any number of one or more telephone numbers or identifies with the mobile client for routing internally and externally initiated calls via signaling to the contact address for the mobile client system 100.

The signaling interface 108 further can include a media session control block 118 that is programmed for providing session description information to signaling requests and replies that can be utilized by a third party or the IP PBX for establishing session description parameters for a given media session. The session description information can be provided in a predefined format for describing streaming media initialization parameters, such as according to a revised specification published by the Internet Engineering Task Force as RFC 4566, which is entitled "SDP: Session Description Protocol," and which is incorporated herein by reference. Those skilled in the art will understand and appreciate other protocols and types of information that can be implemented by the media session control 118 of the signaling interface 108.

The system 100 can include a coverage detection function 120 that is programmed to determine an indication of call coverage for one or more of the voice interfaces 104 and 106. Those skilled in the art will understand various parameters that can be analyzed and metrics that can be employed to ascertain the level of coverage the mobile client has using a respective radio technology.

By way of example, the coverage detection function 120 in FIG. 3 includes a signal monitor 122. The signal monitor 122 can be utilized to monitor wireless signals received by the mobile client from one or more base stations. The signal monitor can provide signal information that characterizes a property of the signals monitored via a respective interface 104 and 106. For the example of a cellular radio technology, the base station typically corresponds to a cellular tower, whereas for a WiFi radio technology, the base station can correspond to an access point or a signal repeater. As one example, the signal monitor can provide an indication of signal strength and/or signal quality for one or more base stations from which a given interface 104 or 106 receives signals. For instance, the indication of signal strength can be based on measurements of signal strength performed by the signal monitor 122 of the mobile client. The signal strength can also include an indication of the signal strength of a signal transmitted from the mobile client to a base station. The signal strength indicator can be considered separately for each of the base station with which each voice interface is in communication. Alternatively, the signal strength characteristics can be aggregated for a plurality of base stations.

Additionally, or alternatively, the signal monitor 122 can be programmed to determine an indication of signal quality for communication using one or more radio technology. The signal monitor 122, for example, can determine signal quality as a signal to noise ratio (SNR), a signal to interference plus noise ratio (SINR), a path loss computation, other approach or combination of different approaches to ascertain a level of signal quality for wireless communication. The particular mechanism (or combination of mechanisms) used to determine signal quality further may vary according to the type of radio technology.

The coverage detection function 120 can also include a location monitor 124. The location monitor 124 can be utilized to provide location information that represents a relative or absolute location of the mobile client. Those skilled in the art will understand and appreciate various approaches that can be utilized to determine a location of the mobile client. For example, the location of the mobile client can be determined from call data, such as a base station ID (e.g., cell ID, access point name, or the like), a location area code (LAC), as well from global position system (GPS) data, or other beacons or information that can be utilized to ascertain a location of the mobile client via a respective interface 104,106,108 or other components (not shown). Additionally or alternatively, the location monitor 124 can employ information from the signal monitor 122, such as signal information mentioned herein. As a further example, the location information can be employed to determine a relative location or proximity of the mobile client with respect to the wireless network supported by the private network to which the mobile client has been authenticated. The indication of location can be derived based upon a variety of location parameters.

The coverage detection function 120 can employ any one or combination of parameters, such as signal information, location information or a combination of signal information and location information to determine whether the mobile client can sustain a voice media session using a respective voice interfaces. For example, the coverage detection function 120 can determine whether a voice call can be sustained over a given one or more of interfaces 104 and 106 based on the signal strength, based on signal quality or based on signal strength and signal quality determined by the signal monitor 122. Additionally or alternatively, the coverage detection function 120 can determine whether a voice call can be sustained over a given one or multiple interfaces 104 and 106 based on the location information provided by the location monitor. The coverage detection function 120 thus can collect a variety of information associated with the signals or other information that it receives via its radio interfaces and thereby determine whether a voice call session can be maintained over a given radio technology. Additionally, the location and/or signal information can be compared relative to mapping or footprint data for a given geographic region as part of the decision about which voice interface 104 or 106 should be employed for a voice call. The predetermined mapping data can be programmed by an administrator, the mapping data can be acquired from mobile clients or the mapping data can be both programmed and learned from mobile clients over time.

Additionally, each of the voice interfaces 104 or 106 can be assigned an order or precedence that indicates a preference as to which voice interface is used by the mobile client system 100 for a voice call. The call manger 102 can thus be programmed to utilize a selected voice interface for a voice media session according to which voice interface has a highest level of precedence and has been determined to be capable of sustaining a voice call. The precedence can be fixed regardless of other operating parameters. Alternatively, the precedence can be assigned as a function of one or more operating parameters, such as least cost routing, time of day, expected quality of service or the like.

The system 100 further includes a handoff control 130 that is programmed to control switching between different radio technologies, such as to switch an active voice call from the first voice interface 104 to a different voice interface 106. The handoff control 130 can be programmed to trigger a handover event between radio technologies based on a variety of trigger mechanisms such as described herein. The handover control 130 can utilize the coverage indicator information obtained from the coverage detection function 120 for one or more of the voice interfaces 104 and 106. While the coverage detection function is depicted as a separate block, it will be understood that the same or similar functionality can be implemented as part of the handoff control 130.

As a further example, the handoff control 130 can include a handoff analysis method 132 that is programmed to apply coverage detection information, such as determined by the coverage detection function 120 (e.g., from the signal monitor 122 and/or location monitor 124), relative to predetermined handoff criteria 134. The handoff criteria 134 can establish a predetermined set of one or more metrics indicative of circumstances when handoff may be required or desired. The handoff analysis 126 can implement a corresponding algorithm that determines if circumstances (based on application of the coverage detection and other handoff parameters to the handoff criteria 134) are appropriate for requiring handoff. In response to the application of the handoff criteria 134 to the results of the coverage detection information (as well as any other handoff indicating parameters that may be monitored), the handoff control 130 can employ a handoff trigger 136 to cause the call manger 102 to initiate a handoff between different radio technologies associated with the voice interfaces 104 and 106. Some additional implementation examples that can be utilized by the handover control to control the handoff between different radio technologies are disclosed in the above-incorporated U.S. patent application Ser. No. 11/778,831. The call manager logic can be programmed to employ different procedures depending on which types of radio technologies are being utilized before, during and after the handoff.

By way of example, the call manger 102 can receive (or maintain) call data 140, such as may vary in response to information entered via a user interface 142 of the mobile client system 100. The call data 140, for example, can include call state data that represents an indication of the state of a call. The call can have a call connected state, a call set up state or a call disconnected state. The particular state of the call further can vary in response to instructions received from a user interface 142 for the mobile client system 100. The user interface 142 can provide instructions to connect or disconnect a call as well as provide a called number entered by a user. It is to be understood and appreciated that the signal monitor 122 and the location monitor 124 as well as any other parameters could be monitored for determining which of the plurality of radio technologies should be utilized for a voice media session between the mobile client system and the third party.

Figure 4:
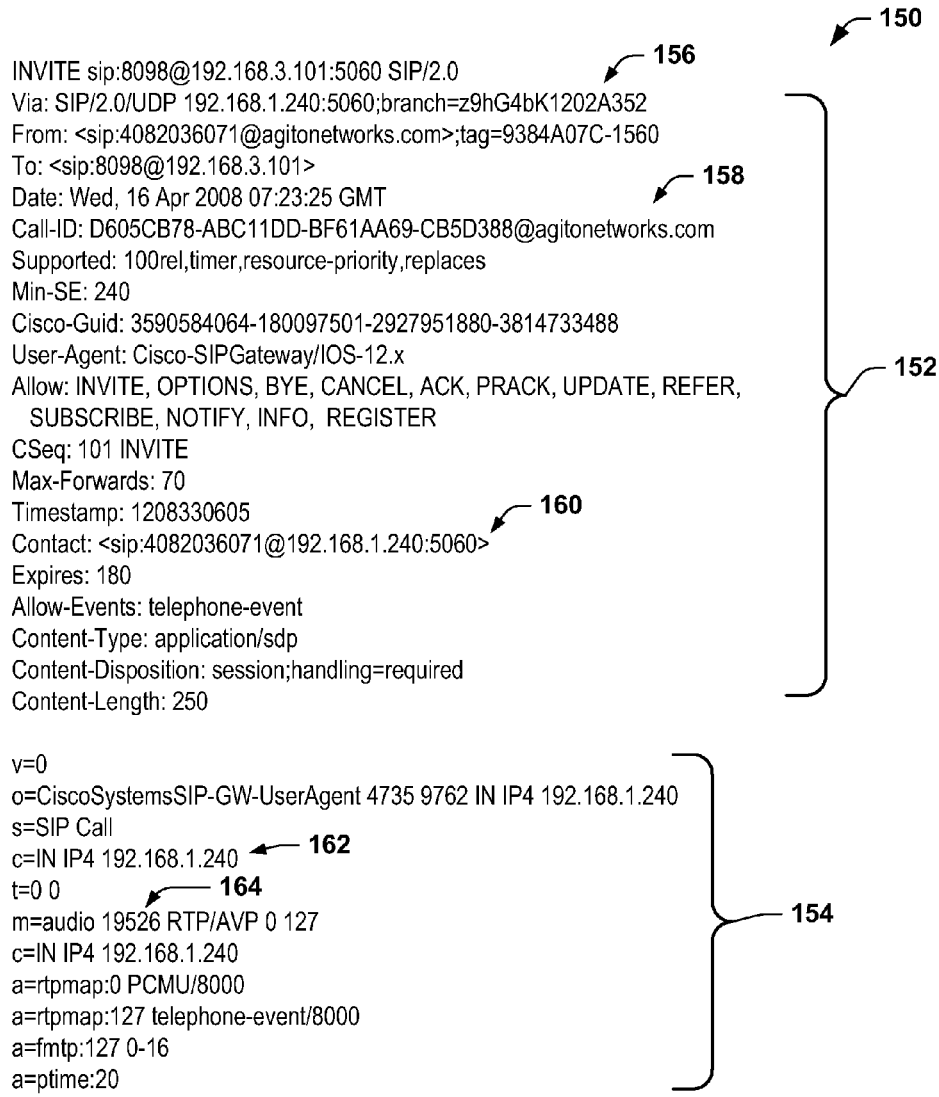
FIG. 4 is an example of an invite request that can be utilized as part of signaling in a system implemented according to an aspect of the invention.

As described herein, the call manager 102 of the mobile client can employ the signaling interface 108 to set up a voice call using one of the voice interfaces 104 or 106 as well as to perform a substantially seamless handover of an on-going voice call between different radio technologies. By way of further example, FIG. 4 depicts an example of a SIP-based invite request 150, such as can be sent to a contact address associated with a signaling interface of a mobile client according to an aspect of the invention. In the example FIG. 4, the invite request 150 include a set of SIP header fields 152 as well as session description information 154 that includes details associated with the media session being requested.

Thus, the SIP header field 152 identifies the respective parties as well as provides a unique identifier 156 for the transaction being initiated and a global unique identifier for the call (or Call-ID) indicated at 158. The invite request 150 also includes a command sequence (Cseq) for the method name being provided by the request, which in the example of FIG. 4 corresponds to a 101 code for an INVITE request. Also provided in the request 150 is a contact address of the gateway corresponding to the SIP URI for directly routing the call to the source of the invite request, indicated at 160.

The session description portion 154 also includes details about the protocol formats and specific connection information associated with the invite request 150 and the media session being requested. Those skilled in the art will understand and appreciate various coding formats that can be utilized to provide for the session details. For example, the connection information in the session description can include a specific connection address for sending the media package, which address is indicated at 162 via the designator "c" and a port number is indicated at 164 via the media designator "m". Those skilled in the art will understand and appreciate other types of information and session detail information that can be provided for establishing a media session, such as based on any known or yet to be developed public or proprietary standard.

FIG. 5 depicts an example of a reply 180 that can be sent from a mobile client in response to the invite request 150 of FIG. 4. The reply 180 includes a plurality of SIP header fields 182 so that the reply can be routed to the sender and be linked to the respective transaction, such as by including the same Call-ID 158 and the transaction identifier 156 as were in the invite request 150 (FIG. 4). Also included with the reply is a SDP media description 184. The SDP media description 184 includes information associated with the type of media session that is to be established including a specific IP address 186 and a port 188 at the mobile client (which provides the reply 180), which port and IP address associated with a voice interface at the mobile client to which the media session will be connected.

FIG. 6 depicts an acknowledgement 190, such as can be provided by the IP PBX or media server in response to the reply 180 of FIG. 5 (e.g., from the mobile client). The acknowledgement 190 thus identifies the signaling message as an acknowledgement that confirms the parameters and protocols associated with the media session being established (as set out in the invite 150 of FIG. 5 and the reply 180 of FIG. 5). The acknowledgement 200 thus includes the global unique identifier or call ID 158 associated with the media session as well as the transaction identifier 156 associated with the signaling.

FIGS. 7-11 depict signaling diagrams for examples of different sequences of signaling that can be utilized for different call scenarios, such as for establishing calls and handing over calls between a mobile client 200 and a third party 202. It is to be understood and appreciated that, depending upon the circumstances, the third party may be within the private enterprise network 212 to which the mobile client has been authenticated or, alternatively, the third party may be outside of the enterprise network. In the examples of FIGS. 7-11, the communication system is depicted as including a public network 204 to which the third party can initiate and receive calls from. Additionally the mobile client 200 can be connected to the public network through a cellular interface 206. The public network 204 can be connected to a gateway/media server 208 and the gateway/media server further can be connected to a PBX 210 that is programmed to perform traditional PBX functions as well as include routing calls to the mobile client when placed to the enterprise number that is registered for the mobile client. Thus the gateway/media server 208 and PBX 210 can be considered to be part of an enterprise network 212. The PBX can be an IP-PBX, such as described herein.

In addition to the cellular interface 206, the mobile client also includes another voice interface, such as a VoIP interface 214 and a substantially persistent data interface 216, such as for performing signaling (e.g., SIP signaling) via the enterprise network 212. The data interface 216 can employ a given radio technology, which can remain fixed or may be modified during operation. It is to be understood and appreciated that the mobile client may include additional interfaces to those interfaces depicted in FIGS. 7-11. Additionally, the mobile client 200 includes call control methods 218 that are utilized to control call signaling, handover as well as other features associated with sending, receiving requests for calls as well as switching calls between different radio technologies such as described herein. FIGS. 7-11 demonstrate example scenarios consistent with the SIP signaling to set up or handoff a call session although, as described herein, the invention can be practiced in other embodiments by employing one or more different types of signaling (e.g., according to any known or yet to be developed signaling protocols).

Figure 7:
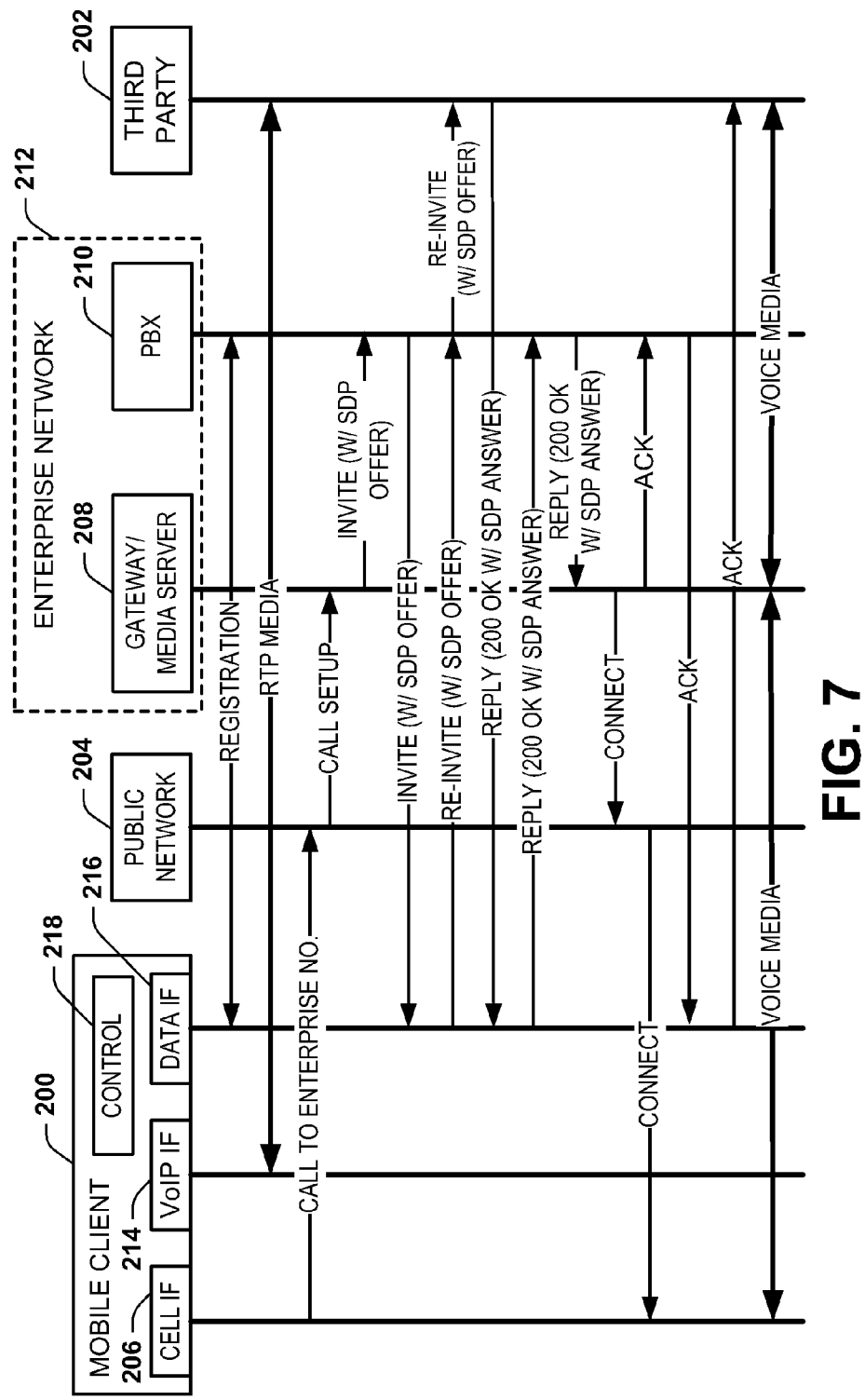
FIG. 7 is a signaling diagram illustrating an example scenario for handing off a from a first radio technology to cellular according to an aspect of the invention.

FIG. 7 depicts an example of a method implemented by the mobile client 200 for performing a handoff for an existing voice call, which is connected using the VoIP interface 214, to the cellular interface 206 according to an aspect of the invention. At the start of the signaling process it is presumed that the mobile client 200 has been registered with the PBX 210 through a corresponding registration process, such as by employing a SIP registration function to upload a contact address for the mobile client 200 with a registrar in the PBX 210. Such registration can occur at power-up as well as may be periodically updated during operation, for example. In the example of FIG. 7, it is presumed that initially a voice call is connected between the mobile client 200 and the third party 202, such as via a WiFi network (or other wireless data network) using RTP media sessions between the VoIP interface 214 of the mobile client and the third party 202.

During this on-going voice call, the call control 218 of the mobile client 200 determines that the call should be switched from the WiFi radio technology to the cellular radio technology. Those skilled in the art will understand and appreciate various mechanisms that can be employed to reach this determination based on the teachings contained herein. In response to this determination, the call control 218 causes the mobile client 200 to initiate a stealth call to itself via its own enterprise number using the cellular interface 206. The call is routed to the public network 204 from the cellular service and the public network initiates a call set-up to the gateway/media server 208, such as part of the enterprise 212.

The gateway/media server 208 in turn sends an invite request with an SDP offer for a media session to the PBX 210. The invite request identifies the enterprise number of the mobile client (or otherwise identifies the mobile client) to which the call was placed. The PBX 210 performs a look-up for the location of the client based on the contact address stored in its registrar and sends an invite to the substantially persistent data interface 216 that has been registered for the mobile client 200. This invite includes an SDP offer associated with the media session from the stealth call that was initiated by the mobile client. The call control 218 detects that the invite request from the PBX 210 corresponds to the self-initiated call to its own enterprise number. This can be based on information in a "FROM" field (e.g., Caller ID) or other data provided in the invite request from the PBX 210 to the data interface 216.

In response to this invite request (from the PBX), the call control 218 causes the mobile client 200 to send a re-invite from the data interface 216 to the third party 202 with a corresponding SDP offer. This re-invite is typically sent through PBX 210, which corresponds to an outgoing call from the client to the third party 202. The SDP offer in this re-invite request includes an address and port or other identifying information for requesting the third party 202 to send its media not to the VoIP Interface 214, but instead to an address and port at the gateway/media server 208 to which the cellular call placed by the mobile client 200 will be connected. The re-invite includes the appropriate transaction identifier and global unique identifier for the call so that the third party 202 knows that the re-invite corresponds to a change in the session description associated with the existing voice call between the mobile client 200 and third party. The third party 202 accepts the re-invite by sending a reply back to the data interface 216 with a corresponding SDP answer.

The data interface 216, in response to this reply from the third party 202, sends a reply back to the initial invite from the PBX 210 that includes an SDP answer. The PBX 210 in turn sends a reply back to the gateway/media server 208 with a corresponding SDP answer, so that the gateway/media server can in turn send a connect message back through the public network and the cellular interface 206 for establishing the cellular voice call connection between the cellular interface and the gateway/media server 208. Acknowledgements are sent to each of the replies between the gateway/media server and PBX and from the PBX to the data interface 216 and back from the data interface to the third party to enable a substantially seamless handover of the existing call from the WiFi radio technology to the cellular radio technology. As a result, the voice media session is established between the cellular interface 206 and the third party 202 via a call cellular call leg (voice media) between the cellular interface 206 and the gateway/media server 208 and (voice media) between the gateway/media server and the third party.

Figure 8:
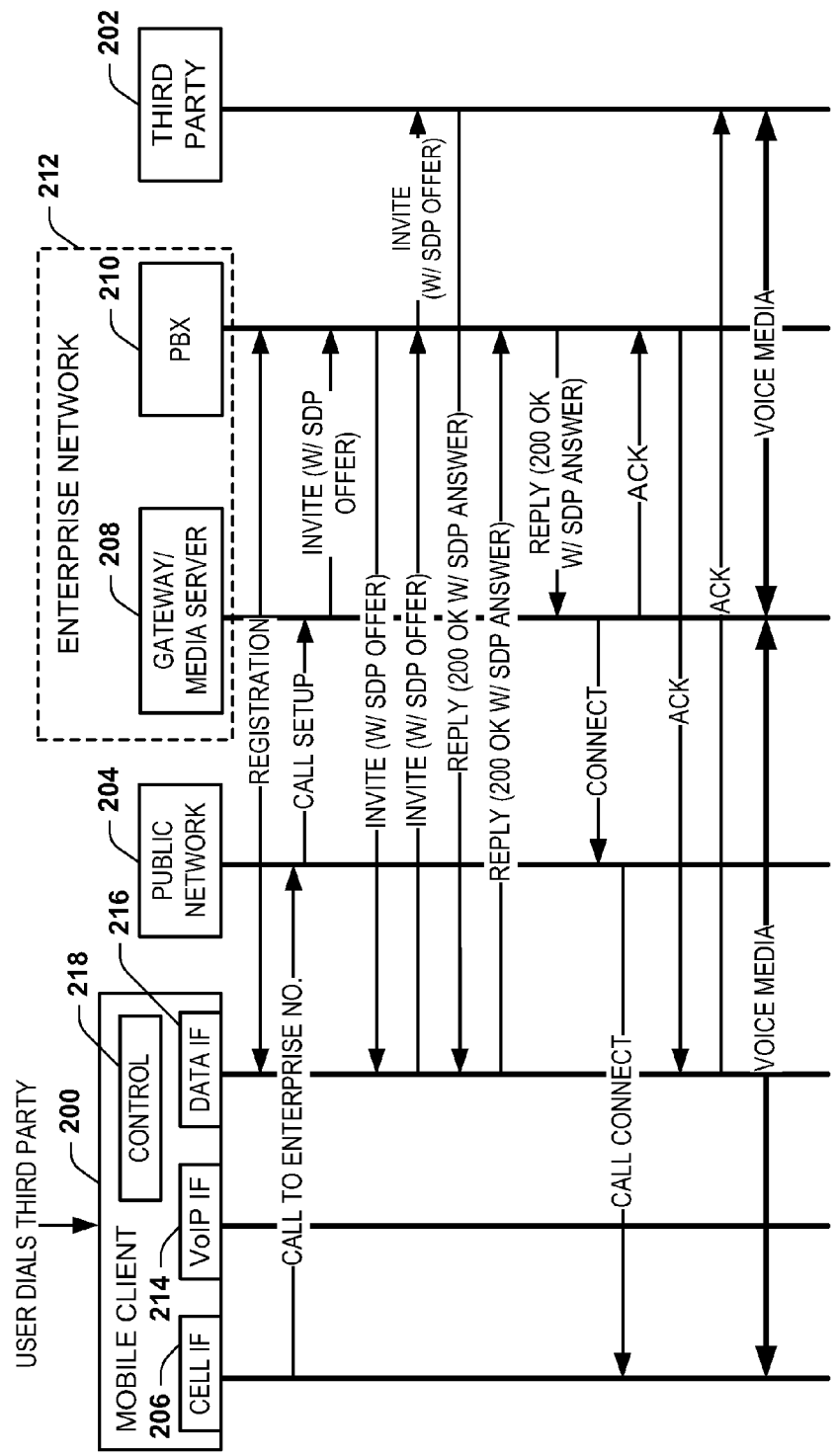
FIG. 8 is a signaling diagram illustrating an example scenario for an outgoing call placed from a mobile client via a cellular radio technology according to an aspect of the invention.

FIG. 8 depicts a signaling diagram for a scenario when a telephone call is placed from the mobile client 200 (e.g., in response to a user dialing the third party) in a situation when the call control 218 determines that no wireless connection is available to sustain the voice call using the VoIP interface 214. Again, in this example, it is presumed that the mobile client 200 has been registered with the PBX 210 through an appropriate registration process.

To initiate the call to the third party, the call control 218 causes the mobile client to call its enterprise number via its cellular interface 206. This call (e.g., a stealth call) to its enterprise number is routed through the public network 204 and a call setup message is presented to the gateway/media server 208. The gateway/media server 208 in turn sends a SIP invite request to the PBX 210 with an SDP offer describing the session description information associated with the call from the mobile client. In response to the invite, the PBX 210 sends an invite to the contact address of the data interface 216 of the mobile client 200 with a corresponding SDP offer. The PBX 210 does this, as described herein, since the data interface 216 has been registered with the PBX for the corresponding enterprise number to which the mobile client 200 placed the stealth call from its cellular interface 206.

In response to recognizing the invite as corresponding to the call initiated by the mobile client 200, the mobile client sends an invite with an SDP offer to the third party 202, via the PBX 210. This SDP offer includes session description information that identifies an address and port at the gateway/media server 208 and call session details associated with the stealth call placed by the mobile client 200. The third party responds to the invite from the mobile client data interface 216 with a reply that also includes a SDP answer with corresponding SDP information for the media session. In response to the reply and SDP answer, the call control 218 of the mobile client 200 issues a reply with SDP answer to the invite from the PBX 210 based on the reply the mobile client received from the third party 202. The PBX 210 in turn sends a reply with an SDP answer to the gateway/media server 208, which reply provides a response to the initial invite provided by the gateway/media server. The gateway/media server 208 subsequently sends a connect message through the public network 204, which responsively issues a call connect message to the cellular interface 206 of the mobile client 200. Appropriate acknowledgements are sent from the gateway/media server 208 to the PBX and from the PBX to the data interface 216 of the mobile client 200 and back from the data interface 216 of the mobile client to the third party 202. The acknowledgements complete the signaling process resulting in a voice media session being established between the cellular interface 206 of the mobile client 200 and the third party 202. Thus, a cellular call leg for the voice media session is provided between the mobile client 200 and the third party 202, which includes a cellular client call leg between the cellular interface 206 and gateway/media server 208 and another voice media leg connecting the third party with the gateway/media server.

Figure 9:
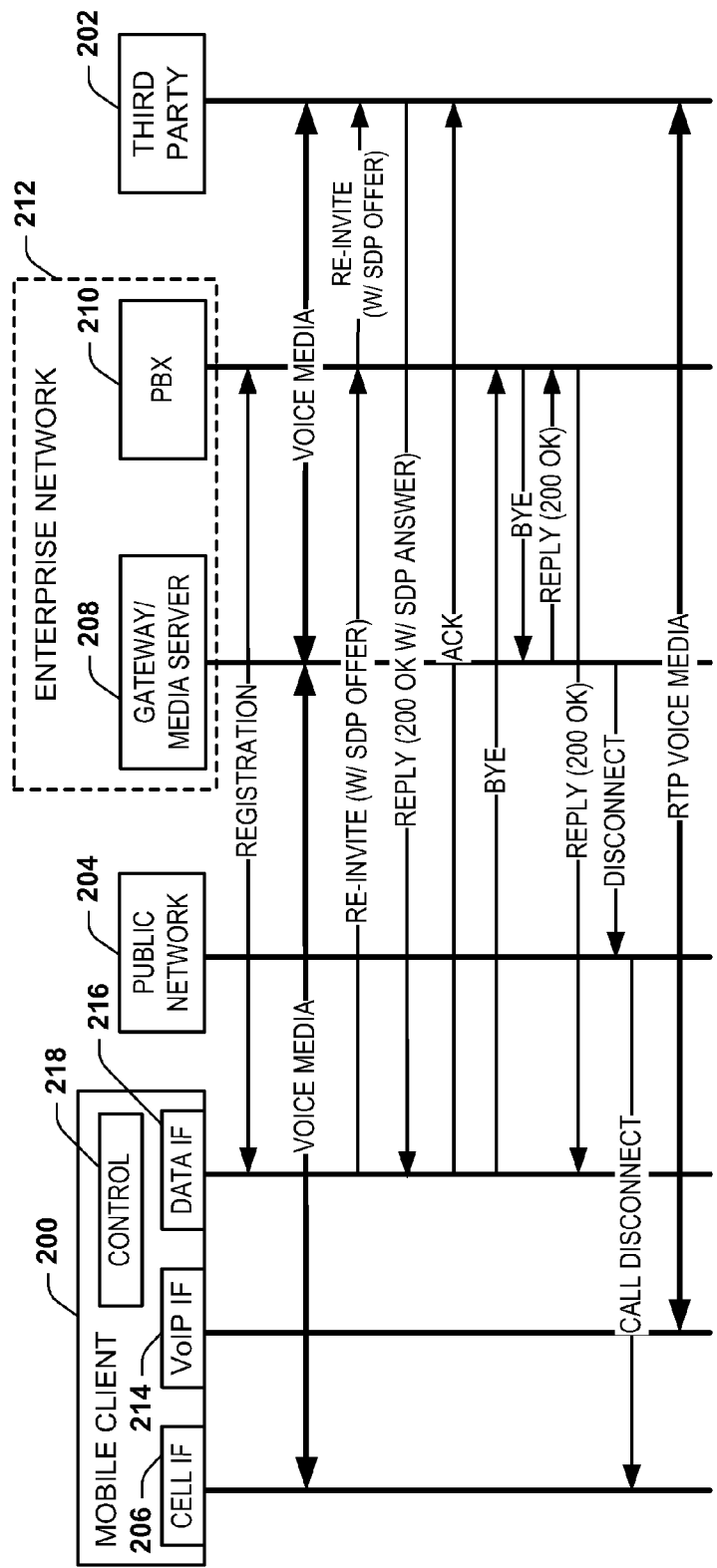
FIG. 9 is a signaling diagram depicting an example scenario for a handoff of an on-going call from a cellular radio technology to a different radio technology implemented by a mobile client according to an aspect of the invention.

FIG. 9 depicts a handoff scenario in which the mobile client hands off an on-going voice media session from a cellular radio technology to a non-cellular radio technology (e.g., WiFi or WiMAX) implemented according to an aspect of the invention. In FIG. 9 it is presumed that the mobile client has previously been registered with the PBX 210 in the enterprise network 212 via an appropriate registration process, such as described herein. Additionally, the scenario of FIG. 9 begins with a voice call established between the mobile client 200 and the third party 202, which includes a voice media client call leg connected between the cellular interface 206 of the mobile client and the gateway/media server 208 and a voice media leg between the third party and the gateway/media server.

During the established voice media session between the mobile client 200 and the third party 202, the call control 218 of the mobile client 200 determines that the call should be handed off from the cellular radio technology to a different radio technology (e.g., a WiFi or WiMAX radio technology) associated with the VoIP interface 214. At this stage, the voice session includes a cellular client call leg between the cellular interface 206 and the gateway/media server 208 and an RTP media stream between the gateway/media server and the third party 202. In response to the call control 218 detecting the circumstances for requiring the change in the radio technology, the call control 218 causes a re-invite request to be sent from the data interface 216 to the third party 202 with an SDP offer associated with the re-invite request. This re-invite request is typically sent through the PBX 210, as depicted, as the client normally does not have a direct route for signaling to the third party 202. As mentioned herein, the data interface provides a substantially persistent connection with the network 212 (e.g., via a cellular data network). The re-invite request includes information sufficient to identify the on-going voice call, such as by including the global unique identifier for the call (e.g., the call-ID). The SDP offer provided with the re-invite also includes parameters to enable the third party to send the media stream to a different address and port associated with the mobile client 200, such as an address and port associated with the VoIP interface 214.

The third party 202 responds to the re-invite request with a reply that also includes an SDP answer which includes media session information for use by the mobile client 200 to enable the voice media session to be established between the VoIP interface 214 and the third party 202. The mobile client 200 in turn sends an acknowledgement from the data interface 216 to the third party 202 to complete the signaling procedure associated with the re-invite. A termination message, such as a BYE request message is sent from the data interface to the PBX on a data call leg facing the cellular call leg from the mobile client to the gateway server. The PBX 210 in turn sends a BYE request message back to the gateway/media server 208 indicating that the voice media session between the cellular interface 206 and the gateway/media server 208 is to be disconnected. A reply is provided in response to each BYE message, such as 200 OK acknowledgement message. In response, the gateway/media server 208 sends a disconnect message through the public network 204 to result in a call disconnect message being provided to the cellular interface 206 of the mobile client 200. The result of the signaling and termination of the cellular interface results in a RTP media stream for providing voice media directly between the VoIP interface 214 of the mobile client 200 and the third party 202.

Figure 10:
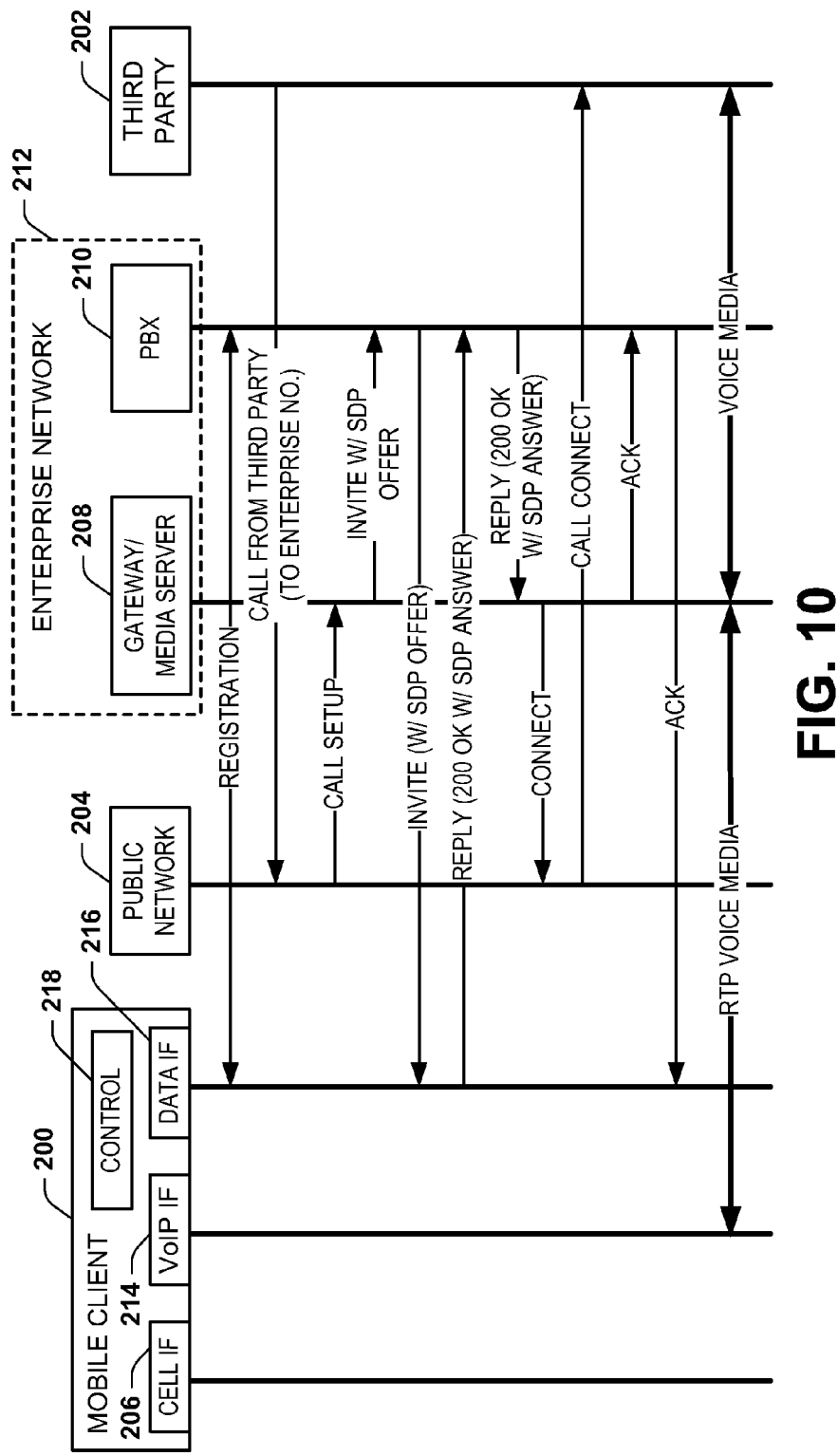
FIG. 10 is a signaling diagram for an example scenario for receiving a call at a mobile client via a VoIP interface according to an aspect of the invention.

FIG. 10 depicts another scenario in which the third party 202 calls the mobile client 200 to establish a voice call when the mobile client can sustain the call using the WiFi voice network. In this situation, the third party 202 initiates a call to the known enterprise number associated with the mobile client 200. The call is routed through the public network 204, which initiates a call setup to the gateway/media server 208. The gateway/media server 208 sends an invite request with an SDP offer to the PBX 210. The PBX 210, in response to detecting the enterprise number in the SDP offer portion of the invite, initiates a corresponding in invite to the registered contact address for the data interface 216 of the mobile client 200.

In response to the call control 218 determining that the mobile client can sustain the call via WiFi, the call control causes a reply to be sent from the data interface 216 back to the PBX. The reply includes an SDP answer that includes session description information for establishing the voice call using the VoIP interface 214. The PBX 210 in turn sends a reply back to the gateway/media server 208 with SDP answer that includes the session description information for establishing the call between the VoIP interface 214 of the mobile client 200 for the call initiated by the third party 202. In response to the reply, the gateway/media server 208 sends a connect message to the public network 204, which results in a corresponding call connect message being issued from the public network 204 to the third party (corresponding to an answered call by the mobile client 200). The gateway/media server 208 also responds with an acknowledgement sent to the PBX 210 in response to the reply previously sent by the PBX to the gateway/media server. In response to the acknowledgement from the gateway/media server 208, the PBX 210 sends an acknowledgement back to the data interface 216 for completing the signaling associated with establishing a voice media session between the mobile client and the third party that initiated the call. Thus, the mobile client 200 has a single voice client call leg for RTP media between the VoIP interface 214 and gateway/media server 208, which call leg is connected with the third party 202 via a voice media stream between the gateway/media server and the third party.

Figure 11:
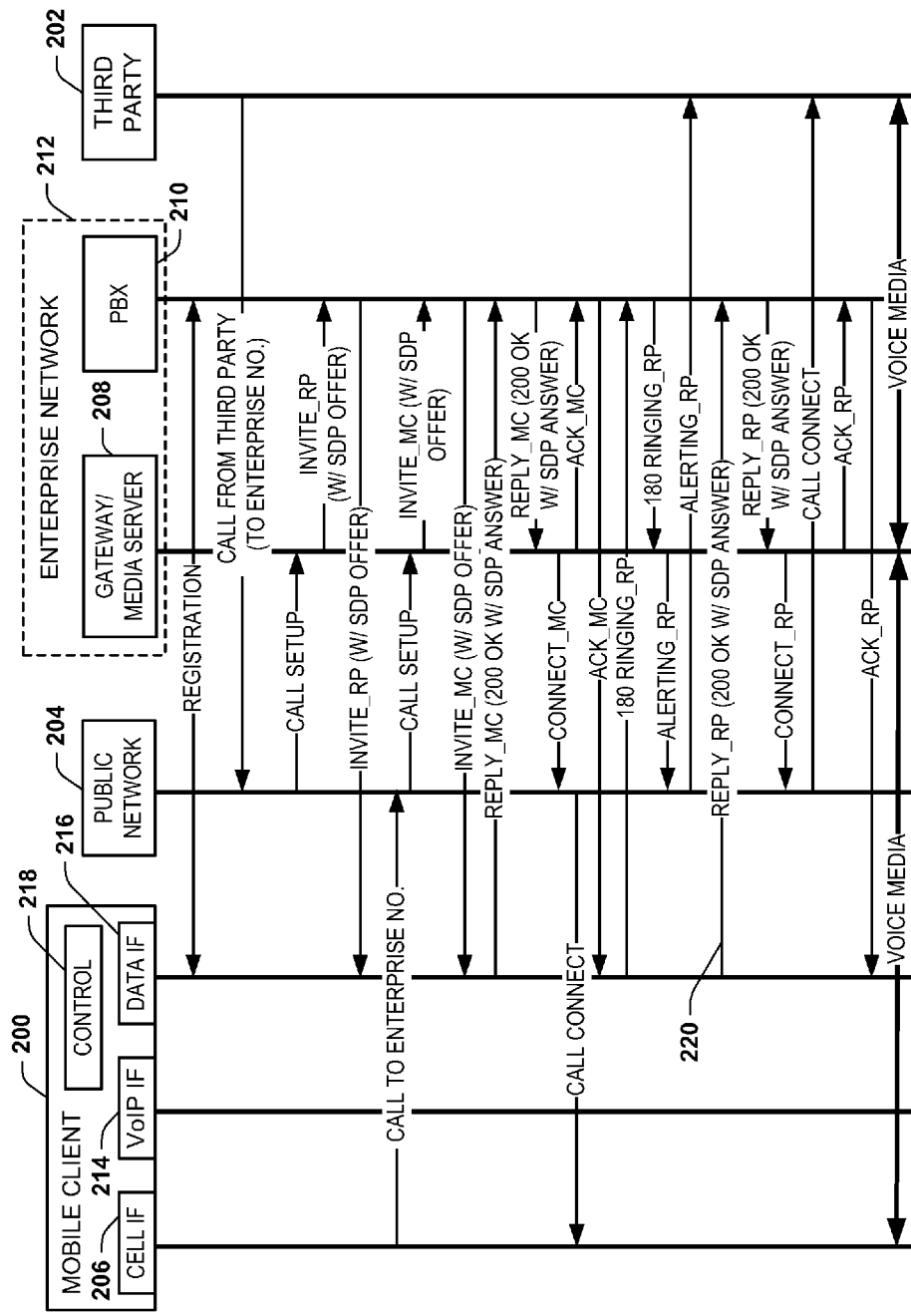
FIG. 11 is a signaling diagram illustrating an example scenario for receiving a call at a mobile client via cellular when no other radio technology is available for receiving the call at the mobile client according to an aspect of the invention.

FIG. 11 depicts yet another scenario in which a call is received via cellular at the mobile client when no WiFi is determined to be available for supporting the voice call. As in the previous scenarios, it is presumed that the mobile client 200 is registered with the PBX 210 to provide for signaling between the data interface 216 and the PBX 210.

The third party 202 initiates a call to the enterprise number for the mobile client 200, which call is routed via the public network to the gateway/media server 208. In particular, the public network 204 provides a call setup message to the gateway/media server 208 for the call from the third party 202. The gateway/media server 208 in turn sends an invite request (INVITE_RP) with a corresponding SDP offer to the PBX 210. To help distinguish between the call leg facing the call initiated by the remote third party and the call leg facing the stealth call from the mobile client, FIG. 11 employs a suffix "RP" to designate the call leg facing the remote third party 202 and a suffix "MC" to designate the call leg facing the mobile client 200. The PBX 210, upon noting the enterprise number in the invite request (based on the registration information for the mobile client 200), sends a corresponding invite request (INVITE_RP) with a corresponding SDP offer to the registered contact address for the data interface 216 of the mobile client 200. The SDP offer includes, for example, information associated with the enterprise number and the third party that initiated the call. The call control 218 of the mobile client 200 determines that the voice call desired by the third party cannot be sustained at the mobile client 200 using the VoIP interface 214, such that the mobile client initiates a stealth call to its own enterprise number via the cellular interface 206.

The stealth call is routed through the public network 204 resulting in a corresponding call setup message being provided to the gateway/media server 208. The gateway/media server 208 in turn sends a SIP invite request (INVITE_MC) to the PBX 210 with an SDP offer describing the session description parameters associated with the self-initiated stealth call from the mobile client 200. In response to this invite, the PBX 210 sends a second invite (INVITE_MC) to the contact address of the data interface 216 of the mobile client 200 with a corresponding SDP offer. Thus, at this stage, the PBX 210 has sent two separate invite requests to the mobile client: the first (INVITE_RP) corresponding to a SIP call leg facing the call initiated by the third party to the enterprise number and the second (INVITE_MC) corresponding to a SIP call leg facing the stealth call initiated by the mobile client. However, no voice session has yet been established.

In response to detecting the second invite request (INVITE_MC), the call control 218 causes the mobile client to send a reply (REPLY_MC) with a SDP answer responsive to the second invite request (INVITE_MC). Part of this SDP answer contains media parameters received along with the first invite request (INVITE_RP). The PBX 210 in turn provides a reply (REPLY_MC) with a SDP answer to the gateway/media server 208. The gateway/media server 208 provides a connect message (CONNECT_MC) to the public network, which causes a corresponding call connect message to be returned to the cellular interface 206. Additionally, acknowledgments are provided to each of the replies (REPLY_MC), namely the gateway/media server 208 provides an acknowledgement (ACK_MC) to the PBX 210 and the PBX provides a corresponding acknowledgement (ACK_MC) to the data interface 216. The data interface 216 meanwhile provides a "180 ringing_RP" response message to the PBX 210 to indicate that the mobile client 200 is trying to alert the user of an incoming call from the third party 202, such as by providing a selected ring tone at the mobile client.

The PBX provides a "180 ringing_RP" response message to the gateway/media server 208 to indicate the mobile client 200 has been alerted of the incoming call, which results in the gateway/media server 208 providing an alert message (ALERTING_RP) through the public network 204 to the third party 202 so that the third party can hear a ringback tone. The user at the mobile client 200 then answers the incoming call, indicated at 220, which results in the data interface 216 providing a reply (REPLY_RP) with a SDP answer back to the PBX 210. This reply (REPLY_RP) is provided in response to the first invite request (INVITE_RP) that the PBX 210 provided to the mobile client 200 in response to the new call from the third party 202. Part of this SDP answer contains media parameters received along with the second invite request (INVITE_MC). The PBX 210 in turn provides a corresponding reply (REPLY_RP) with a SDP answer to the gateway/media server 208, which results in a call connect messages (CONNECT_RP) being provided to the public network 204 and to the third party 202.

The gateway/media server 208 provides an acknowledgement message (ACK_RP) to the PBX 210 responsive to the reply message (REPLY_RP), which provides a corresponding acknowledgment (ACK_RP) back to the data interface 216. This acknowledgement completes the completes the signaling process resulting in a voice media session being established between the cellular interface 206 of the mobile client 200 and the third party 202. Thus, the resulting voice media session includes a cellular call leg (VOICE MEDIA) between the mobile client 200 and gateway/media server 208 and a voice media stream between the gateway/media server and the third party.

In view of the foregoing, it will be appreciated that the mobile client 200 autonomously controls switching between radio technologies for a voice call in each of the scenarios of FIGS. 7-11. For instance, it will be appreciated that, in each scenario (FIGS. 7, 8 and 11) in which a voice call is established at the mobile client 200 over its cellular interface 206 (for both inbound and outbound calls), the mobile client initiates a stealth call to itself and signaling is performed to result in a cellular call leg between the enterprise network 212 and the mobile client. Additionally, in the scenario where the voice call is switched from cellular to the VoIP interface, the mobile client initiates and controls the transfer. Those skilled in the art will understand and appreciate that the signaling examples demonstrate samples of signaling scenarios that may be implemented for a mobile client operating according to an aspect of the invention. Other signaling scenarios could be implemented in other embodiments using SIP or other signaling protocols.

What have been described above are examples and embodiments of the invention. It is, of course, not possible to describe every conceivable combination of components or methodologies for purposes of describing the invention, but one of ordinary skill in the art will recognize that many further combinations and permutations of the present invention are possible. Accordingly, the invention is intended to embrace all such alterations, modifications and variations that fall within the scope of the appended claims. In the claims, unless otherwise indicated, the article "a" is to refer to "one or more than one."

What is claimed is:

1. A mobile client, comprising:
a first voice interface configured to communicate voice media via a first radio technology;
a second voice interface configured to communicate voice media via a second radio technology, which is different from the first radio technology;
a data interface configured to communicate data to an enterprise network via at least one of the first radio technology and the second radio technology; and
call control programmed to control the data interface to perform signaling from the mobile client to the enterprise network for establishing parameters for handing off a voice media session between the mobile client and a third party from the first voice interface to the second voice interface, the call control controlling the signaling from the mobile client to perform the handoff based on the parameters such that the second voice interface operates according to at least one standard communication protocol after the handoff,
wherein the call control is programmed to control the first voice interface to initiate a stealth call to a predefined enterprise number assigned to the mobile client in response to signaling received from the enterprise network, the stealth call establishing a second client call leg between the second voice interface and the enterprise network, the stealth call occurring along with additional signaling that is used for setting parameters of the on-going voice media session to transfer the on-going media session at the mobile client from the first voice interface to the second voice interface, wherein the call control is programmed to control the data interface, in response to receiving the signaling from the enterprise network that is provided in response to the stealth call, to perform signaling for connecting a media stream from the third party with the enterprise network to handoff the voice media session from the first voice interface to the second voice interface, and wherein the call control is programmed to control the data interface to perform signaling to cause a first client call leg that is connected between the first voice interface and the enterprise network to be disconnected after the on-going media session has been transferred to the second voice interface.

2. The mobile client of claim 1, wherein the call control further comprises a coverage detection function programmed to provide an indication of voice radio coverage for the mobile client for at least one of the first radio technology and the second radio technology, the call control determining which of the first voice interface and the second voice interface to utilize for the voice media session based on the indication of voice radio coverage.

3. The mobile client of claim 2, wherein the radio coverage detection function further comprises a signal monitor programmed to provide the indication of voice radio coverage based on monitoring a radio signal received via the least one of the first radio technology and the second radio technology.

4. The mobile client of claim 2, wherein the radio coverage detection function further comprises a location monitor programmed to provide the indication of voice radio coverage based on a location of the mobile client.

5. The mobile client of claim 2, wherein the call control further comprises handoff control that is programmed to control the handing off of the voice media session between the mobile client and the third party from the given voice interface to the another voice interface based on the indication of voice radio coverage during the on-going voice media session.

6. The mobile client of claim 1, wherein, during the on-going media session between the mobile client and the third party via the given voice interface, the call control controls the data interface to initiate signaling in response to determining that the on-going media session between the mobile client and the third party at least one of (i) can be sustained sufficiently using the second radio technology via the second voice interface and (ii) cannot be sustained sufficiently using the first radio technology via the first voice interface.

7. The mobile client of claim 1, wherein the first voice interface comprises a cellular radio interface for communication via a cellular radio technology, and
wherein the second voice interface comprises a voice over internet protocol interface.

8. The mobile client of claim 1, wherein each of the stealth call and the call placed to the mobile client from the third party are routed to a common public telephone number corresponding to the mobile client.

9. The mobile client of claim 1, wherein the call control is further programmed to send a signaling request via the data interface of the mobile client to the third party that includes session description information for the another voice interface.

10. The mobile client of claim 1, wherein the enterprise network comprises a Session Initiation Protocol (SIP) interface to create, modify and/or terminate a session with the mobile client and the third party in response to instructions and the signaling provided by the call control of the mobile client.

11. A non-transitory computer readable medium comprising computer executable instructions that when executed by a processor facilitate the performance of a method on a mobile client, the method comprising:
controlling a data interface of the mobile client to perform signaling from the mobile client to an enterprise network for establishing parameters for handing off a voice media session between the mobile client and a third party from a first voice interface to a second voice interface;
controlling the first voice interface to initiate a stealth call to a predefined enterprise number assigned to the mobile client in response to signaling received from the enterprise network, the stealth call establishing a second client call leg between the second voice interface and the enterprise network, the stealth call occurring along with additional signaling that is used for setting parameters of the on-going voice media session to transfer the on-going media session at the mobile client from the first voice interface to the second voice interface;
controlling the data interface, in response to receiving the signaling from the enterprise network that is provided in response to the stealth call, to perform signaling for connecting a media stream from the third party with the enterprise network to handoff the voice media session the first voice interface to the second voice interface, and
controlling the data interface to perform signaling to cause a first client call leg that is connected between the first voice interface and the enterprise network to be disconnected after the on-going media session has been transferred to the second voice interface.

12. The non-transitory computer readable medium of claim 11, wherein the method further comprises providing an indication of voice radio coverage for the mobile client for at least one of the first radio technology and the second radio technology, and determining which of the first voice interface and the second voice interface to utilize for the voice media session based on the indication of voice radio coverage.

13. The non-transitory computer readable medium of claim 12, wherein the method further comprises providing the indication of voice radio coverage based on monitoring a radio signal received via the least one of the first radio technology and the second radio technology.

14. The non-transitory computer readable medium of claim 12, wherein the method further comprises providing the indication of voice radio coverage based on a location of the mobile client.

15. The non-transitory computer readable medium of claim 12, wherein the method further comprises controlling the handing off of the voice media session between the mobile client and the third party from the given voice interface to the another voice interface based on the indication of voice radio coverage during the on-going voice media session.

16. The non-transitory computer readable medium of claim 11, wherein, during the on-going media session between the mobile client and the third party via the given voice interface, the method further comprises controlling the data interface to initiate signaling in response to determining that the on-going media session between the mobile client and the third party at least one of (i) can be sustained sufficiently using the second radio technology via the second voice interface and (ii) cannot be sustained sufficiently using the first radio technology via the first voice interface.

17. The non-transitory computer readable medium of claim 11, wherein the first voice interface comprises a cellular radio interface for communication via a cellular radio technology, and
  wherein the second voice interface comprises a voice over internet protocol interface.

18. The non-transitory computer readable medium of claim 11, wherein each of the stealth call and the call placed to the mobile client from the third party are routed to a common public telephone number corresponding to the mobile client.

19. The non-transitory computer readable medium of claim 11, wherein the method further comprises sending a signaling request via the data interface of the mobile client to the third party that includes session description information for the another voice interface.

20. The non-transitory computer readable medium of claim 11, wherein the enterprise network comprises a Session Initiation Protocol (SIP) interface to create, modify and/or terminate a session with the mobile client and the third party in response to instructions and the signaling provided by the call control of the mobile client.

* * * * *